United States Patent
Minachi et al.

(10) Patent No.: US 7,481,947 B2
(45) Date of Patent: Jan. 27, 2009

(54) FERRITE MAGNETIC MATERIAL AND FERRITE SINTERED MAGNET

(75) Inventors: Yoshihiko Minachi, Tokyo (JP); Junichi Nagaoka, Tokyo (JP); Shunsuke Kurasawa, Tokyo (JP); Noboru Ito, Tokyo (JP); Taku Murase, Tokyo (JP); Takeshi Masuda, Tokyo (JP); Kenya Takagawa, Tokyo (JP); Hidenobu Umeda, Tokyo (JP)

(73) Assignee: TDK Corporation, Tokyo (JP)

( * ) Notice: Subject to any disclaimer, the term of this patent is extended or adjusted under 35 U.S.C. 154(b) by 296 days.

(21) Appl. No.: 10/581,212

(22) PCT Filed: Dec. 8, 2004

(86) PCT No.: PCT/JP2004/018286

§ 371 (c)(1),
(2), (4) Date: May 30, 2006

(87) PCT Pub. No.: WO2005/056493

PCT Pub. Date: Jun. 23, 2005

(65) Prior Publication Data

US 2007/0099033 A1    May 3, 2007

(30) Foreign Application Priority Data

| Dec. 9, 2003 | (JP) | 2003-411030 |
| Dec. 9, 2003 | (JP) | 2003-411031 |
| Jan. 29, 2004 | (JP) | 2004-021192 |
| Jan. 29, 2004 | (JP) | 2004-021193 |
| Apr. 27, 2004 | (JP) | 2004-130747 |

(51) Int. Cl.
*C04B 35/26* (2006.01)
*H01F 1/10* (2006.01)

(52) U.S. Cl. .............. 252/62.63; 252/62.58; 252/62.57; 252/62.59

(58) Field of Classification Search .............. 252/62.63, 252/62.58, 62.59, 62.57
See application file for complete search history.

(56) References Cited

FOREIGN PATENT DOCUMENTS

| JP | 61-029415 | 2/1986 |
| JP | 08-119634 | 5/1996 |
| JP | 08-191008 | 7/1996 |
| JP | 11-251127 | 9/1999 |
| KR | 2001-0050237 | 6/2001 |
| WO | WO 97/35815 | 10/1997 |
| WO | 02/063641 | 8/2002 |

*Primary Examiner*—C. Melissa Koslow
(74) *Attorney, Agent, or Firm*—Hogan & Hartson LLP

(57) ABSTRACT

A ferrite magnetic material comprising a main phase of W-type is provided which has magnetic properties improved through the optimization of additives. The ferrite magnetic material comprises a main constituent having a compound represented by composition formula $AFe^{2+}_a Fe^{3+}_b O_{27}$ (wherein A comprises at least one element selected from Sr, Ba and Pb; $1.5 \leq a \leq 2.1$; and $12.9 \leq b \leq 16.3$), a first additive containing a Ca constituent (0.3 to 3.0 wt % in terms of $CaCO_3$) and/or a Si constituent (0.2 to 1.4 wt % in terms of $SiO_2$), and a second additive containing at least one of an Al constituent (0.01 to 1.5 wt % in terms of $Al_2O_3$), a W constituent (0.01 to 0.6 wt % in terms of $WO_3$), a Ce constituent (0.001 to 0.6 wt % in terms of $CeO_2$), a Mo constituent (0.001 to 0.16 wt % in terms of $MoO_3$), and a Ga constituent (0.001 to 15 wt % in terms of $Ga_2O_3$).

19 Claims, 30 Drawing Sheets b

FIG. 1

| Composition analysis value | | CaCO₃ [wt%] | SiO₂ [wt%] | WO₃ [wt%] | Coercive force (HcJ) [Oe] | Residual Magnetic Flux Density (Br) [G] | Phases |
|---|---|---|---|---|---|---|---|
| a | b | | | | | | |
| 2.0 | 12.6 | 1.0 | 0.5 | 0.5 | 2627 | 4432 | W phase |
| | 12.8 | | | | 2631 | 4426 | |
| | 13.0 | | | | 3003 | 4415 | |
| | 13.2 | | | | 3024 | 4423 | |
| | 13.4 | | | | 3035 | 4406 | |
| | 13.6 | | | | 3032 | 4409 | |
| | 13.8 | | | | 3045 | 4416 | |
| | 14.0 | | | | 3069 | 4410 | |
| | 14.2 | | | | 3046 | 4412 | |
| | 14.4 | | | | 3118 | 4400 | |
| | 14.6 | | | | 3150 | 4425 | |
| | 14.8 | | | | 3130 | 4430 | |
| | 15.0 | | | | 3321 | 4424 | |
| | 15.2 | | | | 3325 | 4412 | |
| | 15.4 | | | | 3299 | 4403 | |
| | 15.6 | | | | 3327 | 4461 | |
| | 15.8 | | | | 3382 | 4428 | |
| | 16.0 | | | | 3327 | 4403 | |
| | 16.2 | | | | 3241 | 4409 | |
| | 16.4 | | | | 3241 | 4281 | |
| | 16.6 | | | | 3199 | 4309 | |
| 1.9 | 16.2 | 1.0 | 0.5 | 0 | 743 | 4652 | W phase |
| | | | | 0.1 | 1093 | 4647 | |
| | | | | 0.3 | 3193 | 4498 | |
| | | | | 1.0 | 3075 | 4421 | |
| | | | | 1.5 | 2051 | 4049 | |
| 2.1 | 15.8 | 1.0 | 0.5 | 0 | 2781 | 4593 | W phase |
| | | | | 0.1 | 3024 | 4512 | |
| | | | | 0.3 | 3199 | 4492 | |
| | | | | 0.5 | 3376 | 4449 | |
| | | | | 1.0 | 3491 | 4432 | |
| | | | | 1.5 | 3652 | 4403 | |
| | | | | 2.0 | 3791 | 4275 | W phase + M phase |
| | | | | 3.0 | 4505 | 3881 | M phase + W phase + S phase |
| | | | | 4.0 | 3736 | 3231 | M phase + S phase + W phase |
| | | | | 5.0 | 1880 | 2481 | M phase + S phase + W phase |

FIG. 5

| Composition analysis value | | CaCO₃ [wt%] | SiO₂ [wt%] | WO₃ [wt%] | Coercive force (HcJ) [Oe] | Residual Magnetic Flux Density (Br) [G] | Phases |
|---|---|---|---|---|---|---|---|
| a | b | | | | | | |
| 2.0 | 12.4 | 0.7 | 0.45 | 0.1 | 2611 | 4423 | W phase |
| | 12.8 | | | | 2891 | 4416 | |
| | 13.2 | | | | 3009 | 4407 | |
| | 13.6 | | | | 3005 | 4412 | |
| | 14.0 | | | | 3024 | 4421 | |
| | 14.4 | | | | 3033 | 4411 | |
| | 14.8 | | | | 3046 | 4428 | |
| | 15.2 | | | | 3035 | 4426 | |
| | 15.6 | | | | 3050 | 4465 | |
| | 16.0 | | | | 3052 | 4446 | |
| | 16.4 | | | | 3015 | 4279 | |
| | 16.6 | | | | 3006 | 4301 | |
| 1.9 | 16.2 | 0.7 | 0 | 0.1 | 823 | 4630 | W phase |
| | | | 0.15 | | 1236 | 4553 | |
| | | | 0.45 | | 3042 | 4451 | |
| | | | 0.90 | | 3051 | 4405 | |
| | | | 1.50 | | 2106 | 4003 | |
| 2.0 | 16.0 | 0.7 | 0.45 | 0 | 2948 | 4452 | W phase |
| | | | | 0.1 | 3046 | 4446 | |
| | | | | 0.3 | 3055 | 4446 | |
| | | | | 0.5 | 3046 | 4421 | |
| | | | | 0.7 | 2938 | 4364 | W phase + H phase |
| | | | | 1.0 | 2900 | 4315 | |

FIG. 9

| Composition analysis value | | CaCO₃ [wt%] | SiO₂ [wt%] | CeO₂ [wt%] | Coercive force (HcJ) [Oe] | Residual Magnetic Flux Density (Br) [G] | Phases |
|---|---|---|---|---|---|---|---|
| a | b | | | | | | |
| 2.0 | 12.4 | 0.7 | 0.6 | 0.1 | 2855 | 4612 | W phase |
| | 12.8 | | | | 3012 | 4661 | |
| | 13.2 | | | | 3325 | 4653 | |
| | 14.0 | | | | 3351 | 4658 | |
| | 14.8 | | | | 3356 | 4666 | |
| | 15.6 | | | | 3391 | 4670 | |
| | 16.0 | | | | 3395 | 4681 | |
| | 16.4 | | | | 3284 | 4668 | |
| | 16.6 | | | | 3256 | 4468 | |
| 1.9 | 16.2 | 0.7 | 0 | 0.1 | 2989 | 4750 | W phase |
| | | | 0.2 | | 3340 | 4675 | |
| | | | 0.6 | | 3382 | 4654 | |
| | | | 0.9 | | 3362 | 4605 | |
| | | | 1.5 | | 3150 | 4402 | |
| 2.0 | 16.0 | 0.7 | 0.6 | 0 | 3284 | 4666 | W phase |
| | | | | 0.05 | 3388 | 4678 | |
| | | | | 0.1 | 3395 | 4663 | |
| | | | | 0.3 | 3370 | 4654 | |
| | | | | 0.5 | 3356 | 4632 | |
| | | | | 0.7 | 3285 | 4589 | W phase + M phase |

FIG. 13

| Composition analysis value | | CaCO₃ [wt%] | SiO₂ [wt%] | MoO₃ [wt%] | Al₂O₃ [wt%] | WO₃ [wt%] | CeO₂ [wt%] | Coercive force (HcJ) [Oe] | Residual Magnetic Flux Density (Br) [G] | Phases |
|---|---|---|---|---|---|---|---|---|---|---|
| a | b | | | | | | | | | |
| 2.0 | 12.4 | 0.7 | 0.6 | 0.02 | - | - | - | 2759 | 4612 | W phase |
| 2.0 | 12.8 | 0.7 | 0.6 | 0.02 | - | - | - | 3212 | 4610 | W phase |
| 2.0 | 13.2 | 0.7 | 0.6 | 0.02 | - | - | - | 3412 | 4613 | W phase |
| 2.0 | 14.0 | 0.7 | 0.6 | 0.02 | - | - | - | 3395 | 4625 | W phase |
| 2.0 | 14.8 | 0.7 | 0.6 | 0.02 | - | - | - | 3383 | 4635 | W phase |
| 2.0 | 15.6 | 0.7 | 0.6 | 0.02 | - | - | - | 3342 | 4635 | W phase |
| 2.0 | 16.0 | 0.7 | 0.6 | 0.02 | - | - | - | 3320 | 4649 | W phase |
| 2.0 | 16.4 | 0.7 | 0.6 | 0.02 | - | - | - | 3206 | 4627 | W phase |
| 2.0 | 16.6 | 0.7 | 0.6 | 0.02 | - | - | - | 3256 | 4352 | W phase |
| 1.9 | 16.2 | 0.7 | 0 | 0.02 | - | - | - | 1981 | 4715 | W phase |
| 1.9 | 16.2 | 0.7 | 0.1 | 0.02 | - | - | - | 3215 | 4682 | W phase |
| 1.9 | 16.2 | 0.7 | 0.5 | 0.02 | - | - | - | 3395 | 4655 | W phase |
| 1.9 | 16.2 | 0.7 | 1.0 | 0.02 | - | - | - | 3362 | 4606 | W phase |
| 1.9 | 16.2 | 0.7 | 1.5 | 0.02 | - | - | - | 3148 | 4420 | W phase |
| 2.1 | 15.8 | 0.7 | 0.6 | 0 | - | - | - | 3284 | 4686 | W phase |
| 2.1 | 15.8 | 0.7 | 0.6 | 0.01 | - | - | - | 3382 | 4672 | W phase |
| 2.1 | 15.8 | 0.7 | 0.6 | 0.02 | - | - | - | 3400 | 4666 | W phase |
| 2.1 | 15.8 | 0.7 | 0.6 | 0.05 | - | - | - | 3425 | 4658 | W phase |
| 2.1 | 15.8 | 0.7 | 0.6 | 0.10 | - | - | - | 3368 | 4642 | W phase |
| 2.1 | 15.8 | 0.7 | 0.6 | 0.15 | - | - | - | 3342 | 4628 | W phase |
| 2.1 | 15.8 | 0.7 | 0.6 | 0.20 | - | - | - | 3104 | 4552 | W phase + H phase |
| 1.9 | 16.2 | 0.7 | 0.6 | - | 0.60 | 0.10 | - | 3685 | 4602 | W phase |
| 1.9 | 16.2 | 0.7 | 0.6 | - | 0.60 | - | 0.10 | 3677 | 4605 | W phase |
| 1.9 | 16.2 | 0.7 | 0.6 | 0.02 | 0.60 | - | - | 3690 | 4601 | W phase |

FIG. 17

| Composition analysis value | | CaCO₃ [wt%] | SiO₂ [wt%] | Al₂O₃ [wt%] | WO₃ [wt%] | CeO₂ [wt%] | MoO₃ [wt%] | Mean grain size (μm) |
|---|---|---|---|---|---|---|---|---|
| a | b | | | | | | | |
| 1.9 | 16.2 | 1.0 | 0.5 | 0 | – | – | – | 0.86 |
| | | | | 0.1 | – | – | – | 0.79 |
| | | | | 0.3 | – | – | – | 0.80 |
| | | | | 0.5 | – | – | – | 0.78 |
| | | | | 1.0 | – | – | – | 0.79 |
| 2.0 | 16.0 | 0.7 | 0.45 | – | 0 | – | – | 0.85 |
| | | | | – | 0.1 | – | – | 0.80 |
| | | | | – | 0.5 | – | – | 0.75 |
| | | | | – | 1.0 | – | – | 0.75 |
| 2.0 | 16.0 | 0.7 | 0.60 | – | – | 0 | – | 0.61 |
| | | | | – | – | 0.1 | – | 0.52 |
| | | | | – | – | 0.1 | – | 0.53 |
| | | | | – | – | 0.5 | – | 0.60 |
| 2.1 | 15.8 | 0.7 | 0.6 | – | – | – | 0.00 | 0.61 |
| | | | | – | – | – | 0.01 | 0.52 |
| | | | | – | – | – | 0.02 | 0.52 |
| | | | | – | – | – | 0.05 | 0.55 |
| | | | | – | – | – | 0.10 | 0.58 |
| | | | | – | – | – | 0.15 | 0.59 |
| | | | | – | – | – | 0.20 | 0.65 |

FIG. 18

| Composition analysis value | | CaCO₃ [wt%] | SiO₂ [wt%] | Additive [wt%] | | Coercive force (HcJ) [Oe] | Residual Magnetic Flux Density (Br) [G] | Phases | Note |
|---|---|---|---|---|---|---|---|---|---|
| a | b | | | | | | | | |
| 2.0 | 16.0 | 0.45 | 0.7 | | 0 | 2948 | 4452 | W phase | Prepared under the same conditions as in Examples 1-1 and 1-2 |
| | | | | Ta₂O₃ | 0.1 | 2906 | 4489 | | |
| | | | | Sm₂O₃ | 0.03 | 2833 | 4510 | | |
| 2.0 | 16.0 | 0.7 | 0.6 | | 0 | 3284 | 4666 | W phase | Prepared under the same conditions as in Examples 1-3 and 1-4 |
| | | | | TiO₂ | 0.02 | 3046 | 4409 | W phase + M phase + H phase | |
| | | | | | 0.05 | 3095 | 4345 | | |
| | | | | | 0.1 | 3010 | 4364 | | |
| | | | | CuO₂ | 0.05 | 2900 | 4421 | W phase + M phase + H phase | |
| | | | | | 0.1 | 2796 | 4421 | | |
| | | | | | 0.2 | 2631 | 4406 | | |
| | | | | | 0.3 | 2540 | 4428 | | |

FIG. 19

| | $Ga_2O_3$ [wt%] | $Al_2O_3$ [wt%] | Mixed composition | Composition analysis value | | | HcJ [Oe] | Br [G] | Mean grain size [$\mu$m] |
|---|---|---|---|---|---|---|---|---|---|
| | | | a+b | a | b | x | | | |
| Example 2-1 | 0.0 | – | 18 | 1.76 | 13.84 | 0.37 | 3425 | 4675 | 0.53 |
| | 0.1 | – | | | | | 3527 | 4678 | – |
| | 2.0 | – | | | | | 3644 | 4675 | 0.513 |
| | 3.0 | – | | | | | 3824 | 4647 | – |
| | 4.0 | – | | | | | 4157 | 4617 | 0.482 |
| | 5.0 | – | | | | | 4218 | 4595 | – |
| | 6.0 | – | | | | | 4255 | 4547 | – |
| | 7.0 | – | | | | | 4230 | 4510 | 0.476 |
| | 12.0 | – | | | | | 3931 | 4201 | – |
| | 16.0 | – | | | | | 3455 | 3778 | – |
| Example 2-2 | 0.0 | – | 18 | 1.89 | 13.63 | 0.33 | 3461 | 4602 | – |
| | 0.2 | – | | | | | 3559 | 4626 | – |
| | 0.6 | – | | | | | 3589 | 4614 | – |
| | 1.0 | – | | | | | 3681 | 4623 | – |
| | 2.0 | – | | | | | 3834 | 4611 | – |
| | 4.0 | – | | | | | 4078 | 4577 | – |
| | 6.0 | – | | | | | 4316 | 4510 | – |
| | 8.0 | – | | | | | 4340 | 4434 | – |
| Example 2-3 | 3.0 | – | 18 | 1.60 | 14.00 | 0 | 3304 | 4540 | – |
| Example 2-4 | 2.0 | 0.6 | 18 | 1.76 | 13.84 | 0.37 | 3974 | 4669 | – |

Note:
a, a+b: $Sr_{(1-x)}Ba_xFe^{2+}{}_aFe^{3+}{}_bO_{27}$
During mixing a=0 ($Fe^{2+}$ generated from calcining)

FIG. 26

| No. | Ga constituent | | Mixed composition | Composition analysis value | | | HcJ [Oe] | Br [G] |
|---|---|---|---|---|---|---|---|---|
| | Addition timing | Additive amount [wt%] | a+b | a+b | a | x | | |
| Example 3-1 | during mixing | 2.0 | 18 | 15.5 | 1.89 | 0.33 | 3766 | 4547 |
| | | 4.0 | | | | | 3980 | 4544 |
| | | 6.0 | | | | | 3888 | 4470 |
| Example 3-2 | on milling (on second milling) | 2.0 | | | | | 3834 | 4611 |
| | | 4.0 | | | | | 4078 | 4577 |
| | | 6.0 | | | | | 4316 | 4510 |
| Example 3-3 | on milling (on first milling) | 4.0 | | | | | 4145 | 4565 |

Note:
a, a+b: $AFe^{2+}_a Fe^{3+}_b O_{27}$ (wherein A is Sr and Ba)

During mixing a=0 ($Fe^{2+}$ generated from calcining)

FIG. 29

|  | Additive amount[wt%] | | Mixed composition | Composition analysis value | | HcJ [Oe] | Br [G] |
|---|---|---|---|---|---|---|---|
|  | SrCO$_3$ | BaCO$_3$ | a+b | a+b | a | | |
| Example 4-1 | 0 | 2.10 | 18.9 | 16.6 | 1.97 | 3666 | 4492 |
|  |  | 2.45 |  | 16.2 |  | 3760 | 4571 |
|  |  | 2.80 |  | 15.9 |  | 4053 | 4537 |
|  | 0.35 | 1.75 |  | 16.4 |  | 3696 | 4510 |
|  |  | 2.10 |  | 16.0 |  | 3827 | 4550 |
|  |  | 2.45 |  | 15.6 |  | 4017 | 4547 |
|  | 0.70 | 1.40 |  | 16.3 |  | 4017 | 4574 |
|  |  | 1.75 |  | 16.0 |  | 4011 | 4580 |
|  |  | 2.10 |  | 15.7 |  | 4303 | 4571 |
|  |  | 2.45 |  | 15.4 |  | 4133 | 4571 |
|  | 1.05 | 1.40 |  | 15.9 |  | 3949 | 4550 |
|  |  | 1.75 |  | 15.6 |  | 4279 | 4547 |
|  |  | 2.10 |  | 15.3 |  | 4120 | 4510 |
|  | 1.40 | 1.40 |  | 15.5 |  | 4017 | 4473 |
|  |  | 1.75 |  | 15.2 |  | 4151 | 4473 |
|  | 1.75 | 1.40 |  | 15.1 |  | 4023 | 4504 |
| Example 4-2 | 0.70 | 1.40 |  | 16.3 |  | 3895 | 4690 |
|  | 1.05 | 1.40 |  | 15.9 |  | 4078 | 4629 |
|  | 1.40 | 1.40 |  | 15.5 |  | 3821 | 4568 |

Note:
a, a+b: AFe$^{2+}_a$Fe$^{3+}_b$O$_{27}$ (wherein A is Sr and Ba)
During mixing a=0 (Fe$^{2+}$ generated from calcining)

FIG. 30

| | Ga$_2$O$_3$ [wt%] | Al$_2$O$_3$ [wt%] | HcJ [Oe] | Br [G] | sintered body composition (oxide) |
|---|---|---|---|---|---|
| Example 5-1 | 0 | – | 709 | 4916 | SrZn$_{1.5}$Fe$_{15}$ |
| | 0.2 | – | 721 | 4873 | |
| | 0.4 | – | 751 | 4852 | |
| | 0.8 | – | 782 | 4812 | |
| Example 5-2 | – | 0 | 711 | 4895 | SrZn$_{1.3}$Fe$_{14}$ |
| | – | 0.1 | 777 | 4879 | |
| | – | 0.5 | 1005 | 4801 | |
| | – | 1.5 | 1651 | 4602 | |
| Example 5-3 | 0.8 | 0.6 | 1103 | 4707 | SrZn$_{1.2}$Fe$_{13}$ |

FERRITE MAGNETIC MATERIAL AND FERRITE SINTERED MAGNET

TECHNICAL FIELD

The present invention relates to a hard ferrite material, and in particular, to a ferrite magnetic material which can be preferably used in a W-type hexagonal ferrite magnet.

BACKGROUND ART

Conventionally, magnetoplumbite-type hexagonal ferrite, as represented by $SrO\cdot6Fe_2O_3$, i.e., M-type ferrite, has been the main stream in ferrite sintered magnets. Concerning such M-type ferrite magnets, efforts into improving their performance have been pursued with main aims of bringing the ferrite grain size close to the single domain grain size, aligning the ferrite grains in a magnetic anisotropic direction, and increasing the magnet density. As a result of such efforts, the properties of M-type ferrite magnets are edging towards their upper limits, meaning that it has become difficult to expect any dramatic improvements in magnetic properties.

W-type ferrite magnets are known to be capable of exhibiting magnetic properties that are far superior to M-type ferrite magnets. W-type ferrite magnets have a saturation magnetization ($4\pi Is$) about 10% higher than M-type ferrite magnets, and have about the same level for their anisotropic magnetic field. National Publication of International Patent Application No. 2000-501893 discloses a W-type ferrite magnet which consists of a composition represented by $SrO\cdot2(FeO)\cdot n(Fe_2O_3)$, wherein n=7.2 to 7.7, and the mean grain size of the sintered body is 2 µm or less and (BH)max is 5 MGOe or more. It is described that this W-type ferrite magnet is produced by undergoing the respective steps of 1) mixing $SrCO_3$ and $Fe_2O_3$ in a required molar ratio; 2) adding C to the raw powders; 3) calcining the mixture; 4) after calcining, adding CaO, $SiO_2$ and C to the resulting product; 5) milling to a mean particle size of 0.06 µm or less; 6) compacting the obtained milled powders in a magnetic field; and 7) sintering in a non-oxidative atmosphere.

Further, Japanese Patent Laid-Open No. 11-251127 discloses, as a W-type ferrite magnet having a maximum energy product exceeding that of conventional M-type ferrite and having a composition different from that of the conventional art, a ferrite magnet characterized by a basic composition which has an atomic ratio represented by $MO\cdot xFeO\cdot(y-x/2)Fe_2O_3$ (wherein M is one or more selected from among Ba, Sr, Pb and La) wherein $1.7 \leq x \leq 2.1$, $8.8 \leq y \leq 9.3$.

Patent Document 1: National Publication of International Patent Application No. 2000-501893

Patent Document 2: Japanese Patent Laid-Open No. 11-251127

DISCLOSURE OF THE INVENTION

Problems to be Solved By the Invention

W-type ferrite magnets are prepared by adding additives in addition to the basic composition (main composition). These additives are added to improve sinterability or the like, and constitute an important element for W-type ferrite magnets. Although in National Publication of International Patent Application No. 2000-501893 and Japanese Patent Laid-Open No. 11-251127 $CaCO_3$ (or CaO) and $SiO_2$ are typically employed, investigation into other constituents for W-type ferrite magnets is still insufficient.

In view of this, it is an object of the present invention to provide a ferrite magnetic material which has W-type as a main phase whose magnetic properties have been improved through the optimization of additives.

Further, as mentioned above, while various investigations have been carried out into W-type ferrite magnets, there is a need to obtain even higher magnetic properties. In particular, attaining a coercive force value of 3000 Oe or more is important for practical implementation of W-type ferrite. In such a case, obviously, the resulting reduction in residual magnetic flux density must be avoided. That is, both a high coercive force and a high residual magnetic flux density must be achieved for the practical implementation of a W-type ferrite magnet.

Therefore, it is an object of the present invention to improve the magnetic properties, especially coercive force, of W-type ferrite.

Means for Solving the Problems

The present inventors have found that by adding a prescribed amount of $CaCO_3$ (or CaO) and/or $SiO_2$, and further incorporating a prescribed amount of at least one of an Al constituent, a W constituent, a Ce constituent, a Mo constituent and a Ga constituent, high magnetic properties is attainable which could not be attained by only adding $CaCO_3$ (or CaO) and/or $SiO_2$.

The present invention has been completed based on the above finding, and provides a ferrite magnetic material characterized in that a main constituent has a compound represented by composition formula $AFe^{2+}_a Fe^{3+}_b O_{27}$ (wherein A comprises at least one element selected from Sr, Ba and Pb; $1.5 \leq a \leq 2.1$; and $12.9 \leq b \leq 16.3$), a first additive comprises a Ca constituent (0.3 to 3.0% by weight in terms of $CaCO_3$) and/or a Si constituent (0.2 to 1.4% by weight in terms of $SiO_2$); and a second additive comprises at least one of an Al constituent (0.01 to 1.5% by weight in terms of $Al_2O_3$), a W constituent (0.01 to 0.6% by weight in terms of $WO_3$), a Ce constituent (0.001 to 0.6% by weight in terms of $CeO_2$), a Mo constituent (0.001 to 0.16% by weight in terms of $MoO_3$), and a Ga constituent (0.001 to 15% by weight in terms of $Ga_2O_3$).

The ferrite magnetic material of the present invention can provide both a coercive force (HcJ) of 3.0 kOe or more and a residual magnetic flux density (Br) of 4.0 kG or more by optimizing the compositions of the main constituent and the additives.

The ferrite magnetic material according to the present invention can be used in practice in a variety of forms. Specifically, the ferrite magnetic material according to the present invention can be applied in a ferrite sintered magnet. In the case of applying in a ferrite sintered magnet, the sintered body preferably has a mean grain size of 0.8 µm or less, and more preferably 0.6 µm or less. The ferrite magnetic material according to the present invention can also be applied in a ferrite magnet powder. This ferrite magnet powder can be used in a bonded magnet. That is, the ferrite magnetic material according to the present invention can constitute a bonded magnet as a ferrite magnet powder dispersed in a resin. Moreover, the ferrite magnetic material according to the present invention can constitute a magnetic recording medium as a film-like magnetic phase.

The ferrite magnetic material according to the present invention preferably comprises W-type hexagonal ferrite (W phase) as a main phase. Here, in the present invention, W phase is referred to as being the main phase when the W phase molar ratio is 50% or more. From the perspective of magnetic properties, the W phase molar ratio should be 70% or more, preferably 80% or more, and more preferably 90% or more.

"Molar ratio" as used in the present invention is calculated by mixing the respective powders of W-type ferrite, M-type ferrite, hematite and spinel in prescribed ratios, and performing a comparative calculation on the X-ray diffraction intensities thereof (this is also the same in the below-described Examples).

The present inventors further discovered that incorporating a prescribed amount of Ga constituent is effective in improving coercive force while suppressing the decrease in residual magnetic flux density.

That is, the present invention provides a ferrite magnetic material comprising a main phase of W-type hexagonal ferrite, characterized by comprising the Ga constituent of 15% by weight or less (excluding zero) in terms of $Ga_2O_3$. By adding a Ga constituent in the range of 15% by weight or less (excluding zero) in terms of $Ga_2O_3$, coercive force becomes higher than that prior to adding the Ga constituent.

The effects of the improvement in magnetic properties as a result of incorporating a prescribed amount of Ga constituent can be enjoyed not only for $Fe_2$ W-type ferrite having the above-described composition, but also when Zn W-type ferrite is employed as the main constituent. Examples of preferable Zn W-type ferrite compositions include those represented by the composition formula $AZn_cFe_dO_{27}$ (wherein A comprises at least one element selected from Sr, Ba and Pb; $1.1 \leq c \leq 2.1$; and $13 \leq d \leq 17$).

Although W-type ferrite magnets are superior to M-type ferrite magnets in terms of having a higher residual magnetic flux density, if the amount of Ga constituent is from 0.02 to 8.0% by weight in terms of $Ga_2O_3$, coercive force can be improved while also maintaining a higher residual magnetic flux density than M-type ferrite.

Coercive force reaches a peak in the region of 6.0% by weight of the amount of Ga constituent in terms of $Ga_2O_3$. When the amount of Ga constituent in terms of $Ga_2O_3$ is from 3.0 to 8.0% by weight, a coercive force of 3,800 Oe or more and a residual magnetic flux density of 4,400 G or more can both be achieved.

When the amount of Ga constituent in terms of $Ga_2O_3$ is from 0.02 to 3.0% by weight, coercive force can be improved without any decrease in residual magnetic flux density.

According to the present invention, a ferrite magnetic material can be provided which has W-type as a main phase whose magnetic properties have been improved through the optimization of additives. This ferrite magnetic material can constitute a ferrite sintered magnet, a ferrite magnet powder, and the magnetic film of a magnetic recording medium.

BRIEF DESCRIPTION OF THE DRAWINGS

FIG. 1 is a table showing the compositions and magnetic properties of the magnets prepared in Example 1-1;

FIG. 5 is a table showing the compositions and magnetic properties of the magnets prepared in Example 1-2;

FIG. 9 is a table showing the compositions and magnetic properties of the magnets prepared in Example 1-3;

FIG. 13 is a table showing the compositions and magnetic properties of the magnets prepared in Example 1-4;

FIG. 17 is a table showing the relationship between the additive amount of the additives and mean grain size;

FIG. 18 is a table showing the magnet compositions, magnetic properties and phases of the Comparative Example added with comparative additives;

FIG. 19 is a table showing the compositions and magnetic properties of the magnets prepared in Example 2-1 to Example 2-4;

FIG. 26 is a table showing the relationship between the timing for adding the Ga constituent and magnetic properties;

FIG. 29 is a table showing the compositions and the magnetic properties of the magnets prepared in Example 4-1 and Example 4-2; and FIG. 30 is a chart illustrating the magnetic properties when a Ga constituent and/or an Al constituent is added to a sintered body having a Zn W-type main composition.

BEST MODE FOR CARRYING OUT THE INVENTION

Figure 2:
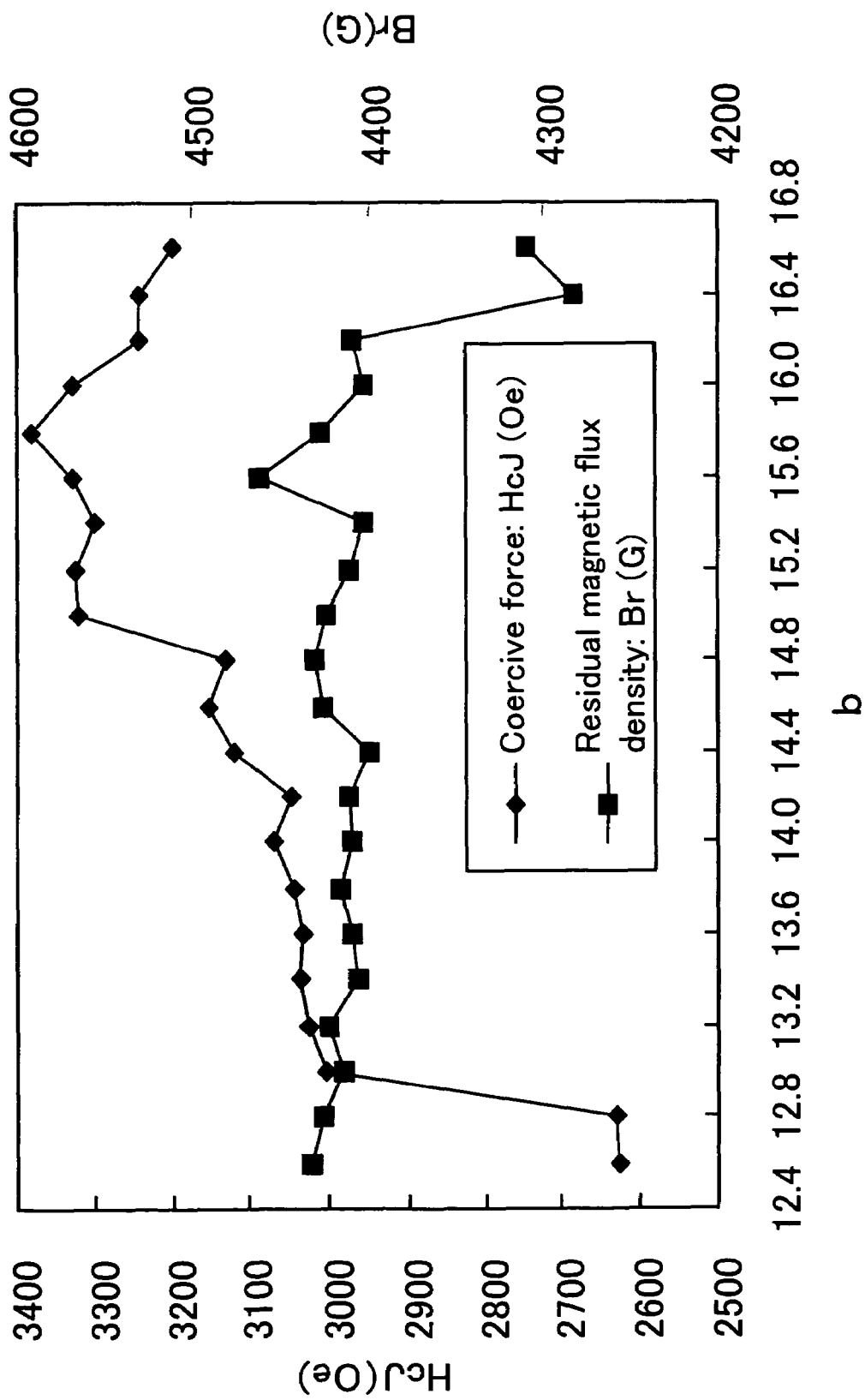
FIG. 2 is a graph showing the relationship between "b" of the sintered body having a main composition represented by $SrFe^{2+}_aFe^{3+}_bO_{27}$ (wherein a=2.0, and b=12.6 to 16.6), coercive force (HcJ) and residual magnetic flux density (Br)

In the case of making the ferrite magnetic material according to the present invention as a $Fe_2$ W-type ferrite, its main composition comprises the below composition formula 1, $$AFe^{2+}_aFe^{3+}_bO_{27} \quad \text{formula 1}$$

wherein "A" comprises at least one element selected from Sr, Ba and Pb; $1.5 \leq a \leq 2.1$; and $12.9 \leq b \leq 16.3$. In the above formula 1, a and b both denote molar ratio.

"A" is preferably at least one kind of Sr and Ba, and from the perspective of magnetic properties, Sr is particularly preferable.

"a" is set within a range of 1.5 to 2.1. If "a" is below 1.5, M phase and $Fe_2O_3$ (hematite) phase, whose saturation magnetization ($4\pi Is$) is lower than W phase, are formed, whereby saturation magnetization ($4\pi Is$) decreases. On the other hand, if "a" exceeds 2.1, spinel phase is formed, and coercive force (HcJ) decreases. Therefore, "a" is set in the range of 1.5 to 2.1. A preferable range for "a" is from 1.6 to 2.0, and a more preferable range is from 1.6 to 1.9.

"b" is set within a range of 12.9 to 16.3. This is because coercive force (HcJ) decreases if "b" is below 12.9, while residual magnetic flux density (Br) decreases if "b" exceeds 16.3. A preferable range for "b" is between 13.5 and 16.2, and a more preferable range is between 14.0 and 16.0.

For $Fe_2$ W-type ferrite it is further preferable to select both Sr and Ba as the "A" element, and have a composition as represented by the below formula 2 as the main composition, $$Sr_{(1-x)}Ba_xFe^{2+}_aFe^{3+}_bO_{27} \quad \text{formula 2}$$

wherein $0.03 \leq x \leq 0.80$; $1.5 \leq a \leq 2.1$; and $12.9 \leq b \leq 16.3$. In the above formula 2, x, a and b each denote molar ratio.

By having the two atoms of Sr and Ba coexist, magnetic properties, especially coercive force, can be improved. Although it is not clear why coercive force improves, the grains constituting the sintered body become finer by having Sr and Ba coexist. It is thought that these grains that have been made finer contribute to the improvement in coercive force.

To enjoy the advantages of an improvement in magnetic properties, in the above formula 2 "x" is preferably set in the range of $0.03 \leq x \leq 0.80$. The reasons for $1.5 \leq a \leq 2.1$ and $12.9 \leq b \leq 16.3$ in the above formula 2 are as stated above.

In the case of employing so-called Zn W-type ferrite, it is preferable to employ a main composition comprising the below composition formula 3, $$AZn_cFe_dO_{27} \quad \text{formula 3}$$

wherein "A" comprises at least one element selected from Sr, Ba and Pb; $1.1 \leq c \leq 2.1$; and $13 \leq d \leq 17$. In the above formula 3, "c" and "d" both denote molar ratio.

A preferable range for "c", which represents the ratio of Zn, is $1.3 \leq c \leq 1.9$, and a more preferable range is $1.3 \leq c \leq 1.7$. A preferable range for "d", which represents the ratio of Fe, is $14 \leq d \leq 16$, and a more preferable range is $14.5 \leq d \leq 15.5$.

It is also preferable to select at least one kind of Sr and Ba as the "A" element for Zn W-type ferrite.

In addition to the main compositions represented by formulae 1, 2 and 3, the ferrite magnetic material according to the present invention also comprises a Ca constituent and/or Si constituent derived from, for example, $CaCO_3$ and $SiO_2$, and, at least one of an Al constituent, a W constituent, a Ce constituent, a Mo constituent and a Ga constituent. While this is specifically described in the below Examples, by incorporating these constituents, regulation or other such adjustment of coercive force (HcJ) and grain size can be performed, whereby a ferrite sintered magnet can be obtained in which coercive force (HcJ) and residual magnetic flux density (Br) are both achieved at a high level. Second additives according to the present invention may obviously be incorporated thereinto in combination.

The Ca constituent and Si constituent as the first additive are set at 0.3 to 3.0% by weight in terms of $CaCO_3$ and 0.2 to 1.4% by weight in terms of $SiO_2$.

If the $CaCO_3$ is less than 0.3% by weight and $SiO_2$ is less than 0.2% by weight, the effects of adding the $CaCO_3$ and $SiO_2$ are insufficient. Meanwhile, if the $CaCO_3$ exceeds 3.0% by weight, there is a risk of Ca ferrite being formed, which is a factor in magnetic property deterioration. If the $SiO_2$ exceeds 1.4% by weight, residual magnetic flux density (Br) tends to decrease. In view of this, the amount of Ca constituent and Si constituent according to the present invention are 0.3 to 3.0% by weight in terms of $CaCO_3$ and 0.2 to 1.4% by weight in terms of $SiO_2$. They are preferably contained in the range of respectively 0.4 to 1.5% by weight in terms of $CaCO_3$ and 0.2 to 1.0% by weight in terms of $SiO_2$, and more preferably contained in the range of 0.6 to 1.2% by weight in terms of $CaCO_3$ and 0.3 to 0.8% by weight in terms of $SiO_2$.

In the case of selecting Ga as the second additive, the $CaCO_3$ is from 0 to 3.0% by weight, preferably from 0.2 to 1.5% by weight, and more preferably from 0.3 to 1.2% by weight.

Next, a preferable amount will be explained for the Al constituent, W constituent, Ce constituent, Mo constituent and Ga constituent as the second additive.

The amount of the Al constituent is only 0.01 to 1.5% by weight in terms of $Al_2O_3$. If the $Al_2O_3$ is less than 0.01% by weight, the effects of addition are insufficient. Meanwhile, if the $Al_2O_3$ exceeds 1.5% by weight, it becomes difficult to make the W phase as the main phase, and residual magnetic flux density (Br) tends to decrease. In view of this, only 0.01 to 1.5% by weight of $Al_2O_3$ is contained as the Al constituent according to the present invention. A preferable $Al_2O_3$ amount is from 0.1 to 0.9% by weight, and a more preferable $Al_2O_3$ amount is from 0.1 to 0.5% by weight.

The amount of the W constituent is only 0.01 to 0.6% by weight in terms of $WO_3$. If the $WO_3$ is less than 0.01% by weight, the effects of addition are insufficient. Meanwhile, if the $WO_3$ exceeds 0.6% by weight, it becomes difficult to make the W phase as the main phase, and residual magnetic flux density (Br) tends to decrease. In view of this, only 0.01 to 0.6% by weight of $WO_3$ is contained as the W constituent according to the present invention. A preferable $WO_3$ amount is from 0.1 to 0.6% by weight, and a more preferable $WO_3$ amount is from 0.1 to 0.4% by weight.

The amount of the Ce constituent is only 0.001 to 06% by weight in terms of $CeO_2$. If the $CeO_2$ is less than 0.001% by weight, the effects of addition are insufficient. Meanwhile, if the $CeO_2$ exceeds 0.6% by weight, it becomes difficult to make the W phase as the main phase, and residual magnetic flux density (Br) tends to decrease. In view of this, only 0.001 to 0.6% by weight of $CeO_2$ is contained as the Ce constituent according to the present invention. A preferable $CeO_2$ amount is from 0.01 to 0.4% by weight, and a more preferable $CeO_2$ amount is from 0.01 to 0.3% by weight.

The amount of the Mo constituent is only 0.001 to 0.16% by weight in terms of $MoO_3$. If the $MoO_3$ is less than 0.001% by weight, the effects of addition are insufficient. Meanwhile, if the $MoO_3$ exceeds 0.16% by weight, it becomes difficult to make the W phase as the main phase, and residual magnetic flux density (Br) tends to decrease. In view of this, only 0.001 to 0.16% by weight of $MoO_3$ is contained as the Mo constituent according to the present invention. A preferable $MoO_3$ amount is from 0.005 to 0.10% by weight, and a more preferable $MoO_3$ amount is from 0.01 to 0.08% by weight.

The content of the Ga constituent is 15% by weight or less (excluding zero) in terms of $Ga_2O_3$. If the $Ga_2O_3$ exceeds 15% by weight, not only is it difficult to enjoy the advantages of the improvement in coercive force as a result of adding the Ga constituent, but residual magnetic flux density (Br) tends to decrease. Thus, the Ga constituent according to the present invention is 15% by weight or less (excluding zero) in terms of $Ga_2O_3$, preferably from 0.02 to 10% by weight, and more preferably from 0.05 to 10% by weight. To enjoy the advantages of the improvement in coercive force as a result of adding a Ga constituent, it is preferable to incorporate 0.001% by weight or more of the Ga constituent.

Further, if the amount of $Ga_2O_3$ is from 0.02 to 3.0% by weight, and preferably from 0.05 to 2.0% by weight, an improvement can be expected in residual magnetic flux density (Br) as well as in coercive force (HcJ). In particular, to attain a coercive force (HcJ) of 3500 Oe or more while maintaining a residual magnetic flux density (Br) of 4500 G or higher, it is effective to set the $Ga_2O_3$ amount at between 0.02 and 3.0% by weight.

On the other hand, if the amount of $Ga_2O_3$ is from 3.0 to 8.0% by weight, and preferably from 4.0 to 7.0% by weight, a coercive force (HcJ) of 3800 Oe or more, even 4000 Oe or more, and preferably 4200 Oe or more, can be attained while maintaining a residual magnetic flux density (Br) of about 4500 G, or even 4600 G or more.

Apart from $CaCO_3$ the Ca constituent can be added in CaO form. The Si constituent and Al constituent can also be added in forms other than $SiO_2$ and $Al_2O_3$. Similarly, the W constituent, Ce constituent, Mo constituent and Ga constituent can also be added in forms other than $WO_3$, $CeO_2$, $MoO_3$, and $Ga_2O_3$.

In the present specification, the oxygen molar ratio is denoted as "27" regardless of the composition. However, the actual oxygen mole number may deviate from the stoichiometric composition ratio of 27.

The composition of the ferrite magnetic material according to the present invention can be determined by fluorescent X-ray quantitative analysis or similar technique. The present invention does not exclude comprising constituents other than the "A" element (at least one element selected from the group consisting of Sr, Ba and Pb), Fe, a first additive and a second additive. For example, the $Fe^{2+}$ or $Fe^{3+}$ sites in the $Fe_2$ W-type ferrite can be partially substituted with another element, and the Zn or $Fe^{3+}$ sites in the Zn W-type ferrite can also be partially substituted with another element.

As described above, the ferrite magnetic material according to the present invention can constitute a ferrite sintered magnet, a ferrite magnet powder, a bonded magnet as a ferrite magnet powder dispersed in a resin, and a magnetic recording medium as a film-like magnetic phase.

The ferrite magnetic material and bonded magnet according to the present invention can be processed into a prescribed shape for use in a broad range of applications such as those listed below. Examples include being used as a motor for use in a vehicle, such as for fuel pumps, power windows, ABS (antilockbrake system), fans, wipers, power steering, active suspension, starter-motors, door locks, electric mirrors and the like. Further examples include motors for use in office automation equipment and audio-visual equipment, such as for FDD spindles, VTR capstans, VTR rotary heads, VTR reels, VTR loading, VTR camera capstans, VTR camera rotary heads, VTR camera zoom, VTR camera focus, capstans in radio cassette recorders or the like, CD, LD, and MD drive spindles, CD, LD and MD loading, CD and LD optical pickups. Further examples include motors for use in home appliances, such as for air conditioner compressors, refrigerator compressors, electric tool driving, fans, microwave oven fans, microwave oven plate rotation, mixer driving, dryer fans, shaver driving, and electric toothbrushes. Still further examples include motors for use in factory automation equipment, such as for robot shafts, connection drives, robot drives, machine tool table drives, and machine tool belt drives. Examples of other preferable applications include motorcycle generators, speaker magnets, headphone magnets, magnetron tubes, MRI magnetic field generating systems, CD-ROM clamps, distributor sensors, ABS sensors, fuel/oil level sensors, magnet latches, isolators and the like.

In the case of making the ferrite magnet powder according to the present invention into a bonded magnet, the mean particle size is preferably from 0.1 to 5 μm. A more preferable mean particle size as the powder for a bonded magnet is from 0.1 to 2 μm, and still more preferable is a mean particle size of from 0.1 to 1 μm.

During production of the bonded magnet, the ferrite magnet powder is kneaded with various binders, such as a resin, metal, rubber and the like, and compacted in a magnetic field or in a non-magnetic field. Preferable examples of the binder include NBR (acrylonitrile butadiene) rubber, polyethylene chloride, and a polyamide resin. After compacting, curing is carried out to yield the bonded magnet. Prior to kneading the ferrite magnet powder with the binder, it is preferable to carry out the below-described heat treatment.

Using the ferrite magnetic material according to the present invention, a magnetic recording medium comprising a magnetic layer can be prepared. This magnetic layer comprises a W-type ferrite phase represented by the above-described composition formulae 1 to 3. Formation of the magnetic layer can be carried out by, for example, vapor deposition or sputtering. In the case of forming the magnetic layer by sputtering, the ferrite sintered magnet according to the present invention can be used as the target. Examples of the magnetic recording medium include hard disks, flexible disks, magnetic tape and the like.

Next, a preferable production method for the ferrite magnetic material according to the present invention will be explained. The production method for a ferrite sintered magnet according to the present invention comprises a mixing step, a calcining step, a pulverizing step, a milling step, a compacting step in a magnetic field, a step of heat-treating compacted body and a sintering step. Here, the milling step is divided into a first milling and a second milling, wherein a powder heat treatment step is carried out between the first milling and the second milling. The Ga constituent may be added prior to the compacting step in a magnetic field; specifically, during the mixing step and/or the milling step. While it has been mentioned here that the milling step is carried out in two stages, the advantageous effects according to the present invention can also be enjoyed even when milling is carried out in one stage, as is illustrated in the below-described Examples 1-1 and 1-2.

The case of obtaining $Fe_2$ W-type ferrite will now be mainly explained, and the conditions in the case of obtaining Zn W-type ferrite will be mentioned as appropriate.

Mixing Step

After weighing out each raw material, a blending and crushing treatment is carried out for about 1 to 16 hours using a wet attritor, ball mill or similar apparatus. As the raw material powders, oxides or compounds which will turn into an oxide upon sintering can be used. While an example will be explained below which uses $SrCO_3$ powder, $BaCO_3$ powder and $Fe_2O_3$ (hematite) powder, in addition to carbonate form the $SrCO_3$ powder and $BaCO_3$ powder can be added as an oxide. The same can be said for Fe, so that compounds other than $Fe_2O_3$ can be added. Moreover, compounds comprising Sr, Ba and Fe can also be used. When it is desired to obtain Zn W-type ferrite, ZnO powder is also prepared in addition to $SrCO_3$ powder, $BaCO_3$ powder and $Fe_2O_3$ (hematite) powder.

In this mixing step, $Ga_2O_3$ powder, and even $CaCO_3$ powder and $SiO_2$ powder, may be added. The additive amounts are as described above. In the present invention powders such as $Cr_2O_3$ may also be added. However, these additives may also be added after calcination of the $SrCO_3$ powder, $BaCO_3$ powder and $Fe_2O_3$ powder, and not added at this stage.

While the mixing ratio of each raw material can be varied depending on the composition which is finally wanted, the present invention is not limited to this embodiment. For example, any of the $SrCO_3$ powder, $BaCO_3$ powder and $Fe_2O_3$ powder can be added after calcining, and adjusted so as to match the final composition.

Calcining Step

The blended powder material obtained from the mixing step is calcined at between 1100 and 1400° C. By carrying out this calcining step in a non-oxidative atmosphere such as nitrogen gas or argon gas, $Fe^{3+}$ in the $Fe_2O_3$ (hematite) powder is reduced to $Fe^{2+}$, whereby $Fe_2$ W-type ferrite is formed. However, if at this stage the amount of $Fe^{2+}$ cannot be sufficiently secured, M phase or hematite phase will be present in addition to W phase. To obtain W single phase ferrite, it is effective to regulate the oxygen partial pressure. This is because if the oxygen partial pressure is lowered, $Fe^{2+}$ is more easily formed from the reduction of $Fe^{3+}$.

In the case of obtaining Zn W-type ferrite, calcining may be conducted in air.

If the additive has already been added during the mixing step, the calcined body can be made into a ferrite magnet powder by pulverizing to a prescribed particle size.

Pulverizing Step

Since the calcined body is generally granular, it is preferable to pulverize it. In the pulverizing step, processing is carried out using a vibration mill or the like until the mean particle size is from 0.5 to 10 μm. The powder obtained here is used as a coarse powder.

First Milling Step

In the first milling step, the coarse powder is wet or dry milled using an attritor, ball mill, jet mill or the like to a mean particle size of 0.08 to 0.8 μm, preferably 0.1 to 0.4 μm, and more preferably 0.1 to 0.2 μm. This first milling step is carried out to eliminate the coarse powder and to make the microstructure of sintered body fine in order to improve magnetic properties. The specific surface area (according to the BET method) is preferably in the range of 20 to 25 $m^2/g$.

While it depends on the milling method, if the pulverized powder undergoes wet milling with a ball mill, milling can be performed for between 60 and 100 hours per 200 g of pulverized powder.

In order to improve coercive force and regulate grain size, it is preferable to add $Ga_2O_3$ powder prior to the first milling step. As illustrated in Example 2 described below, if the $Ga_2O_3$ powder is added prior to the first milling step, the effects of improved coercive force are greater than those when adding in the blending step or second milling step. In addition to $Ga_2O_3$ powder, the powders of $CaCO_3$, $SiO_2$, $SrCO_3$, $BaCO_3$ and the like can also be added prior to the first fine milling step.

In Example 2 described below, addition of $Ga_2O_3$ powder prior to the first fine milling step is referred to as "addition on first milling".

Powder Heat Treatment Step

In the powder heat treatment step, the powder obtained from the first milling is subjected to heat treatment by retaining for between 1 second and 100 hours at between 600 and 1200° C., more preferably 700 to 1000° C.

As a result of undergoing first milling, ultrafine powder of less than 0.1 μm is inevitably formed. If ultrafine powder is present, in some cases problems arise in the subsequent compacting step in a magnetic field. For example, if there is a large amount of ultrafine powder during wet compacting, drainage is poor, which causes problems such as compacting becoming unable to be performed. In view of this, in the present embodiments heat treatment is carried out prior to the compacting step in a magnetic field. That is, this heat treatment is carried out for the purpose of decreasing the amount of ultrafine powder of less than 0.1 μm formed during the first milling by causing it to react with larger particle sized fine powder (e.g. 0.1 to 0.2 μm fine powder). The amount of ultrafine powder decreases as a result of this heat treatment, whereby compacting properties can be improved.

To avoid the $Fe^{2+}$ formed by calcination being oxidized to $Fe^{3+}$, the heat treatment atmosphere in this step is a non-oxidative atmosphere. "Non-oxidative atmosphere" as used in the present invention includes inert gas atmospheres such as nitrogen gas, argon gas and the like. It is acceptable for the non-oxidative atmosphere according to the present invention to comprise 10% by volume or less of oxygen. This level of oxygen amount is such that the oxidation of $Fe^{2+}$ during retention at the above temperature can be ignored.

The heat treatment atmosphere oxygen amount is preferably 1% by volume or less, and more preferably 0.1% by volume or less. In the case of obtaining Zn W-type ferrite, air can serve as the heat treatment atmosphere in this step.

Second Milling Step

In the subsequent second milling step, the milled powder which has undergone heat treatment is wet or dry milled using an attritor, ball mill, jet mill or the like to a mean particle size of 0.8 μm or less, preferably 0.1 to 0.4 μm, and more preferably 0.1 to 0.2 μm. This second milling step is carried out for particle size regulation, necking removal, and improvement in additive dispersion. The specific surface area (according to the BET method) is preferably in the range of 10 to 20 $m^2/g$, and more preferably 10 to 15 $m^2/g$. If the specific surface area is regulated within this range, even if ultrafine particle is present, it is only in a small amount that does not adversely impact on compacting properties. That is, by undergoing the first milling step, the powder heat treatment step and the second milling step, the requirements of not adversely affecting compacting properties and of making the microstructure of sintered body finer can be satisfied.

While it depends on the milling method, in the case of wet milling with a ball mill, milling can be performed for between 10 and 40 hours per 200 g of milled powder. The milling conditions in the second milling step are usually relaxed from those of the first milling step, due to the fact that if the second milling step employs generally the same milling conditions as those of the first milling step, ultrafine powder will again be formed, and the fact that the desired particle size has already been basically attained in the first milling step. Here, whether the milling conditions are relaxed does not depend on the milling time, and can be determined based on the mechanical energy introduced during milling.

In order to improve coercive force and regulate grain size, $Ga_2O_3$ powder can be added prior to the second milling step. In addition to $Ga_2O_3$ powder, the powders of $CaCO_3$ and $SiO_2$, or even $SrCO_3$ and $BaCO_3$ and the like, can also be added prior to the second milling step.

In Example 2 described below, addition of $Ga_2O_3$ powder prior to the second milling step is referred to as "addition on second milling".

Carbon powder, which exhibits a reduction effect in the sintering step, can be added prior to this second milling step. The addition of carbon powder is effective in forming W-type ferrite in a near-single phase (or a single phase). Here, the additive amount of carbon powder (hereinafter "carbon amount") is in a range of 0.05 to 0.7% by weight with respect to the raw material powder. By setting the carbon amount in this range, not only can the effects as a carbon powder reductant in the below-described sintering step be sufficiently enjoyed, but a saturation magnetization ($\sigma s$) higher than the case where a carbon powder had not been added can be obtained. A preferable carbon amount according to the present invention is from 0.1 to 0.65% by weight, and a more preferable carbon amount is from 0.15 to 0.6% by weight. As the carbon powder to be added, well-known substances such as carbon black can be used.

In the present invention, to suppress the added carbon powder from segregating in the compacted body, and to improve the degree of orientation during compacting in a magnetic field, it is preferable to add gluconic acid (or neutralized salt thereof, or lactones thereof) or a polyhydric alcohol represented by the general formula $C_n(OH)_nH_{n+2}$.

If gluconic acid is selected as the dispersant, the additive amount thereof may be from 0.05 to 3.0% by weight with respect to the raw material powders. Neutral salts of gluconic acid are not particularly limited, but can include a calcium salt, sodium salt or the like; and calcium gluconate is preferable. A preferable additive amount of calcium gluconate is from 0.1 to 2.5% by weight, more preferable is from 0.1 to 2.0% by weight, and much more preferable is from 0.5 to 1.8% by weight.

If a polyhydric alcohol is selected as the dispersant, the carbon number "n" in the above general formula is 4 or more. If the carbon number "n" is 3 or less, the effects of suppressing segregation of the carbon powder are insufficient. A preferable value for the carbon number "n" is between 4 and 100, more preferable is between 4 and 30, still more preferable is between 4 and 20, and much more preferable is between 4 and 12. Although sorbitol is preferable as the polyhydric alcohol, two or more polyhydric alcohols maybe used together. Moreover, in addition to the polyhydric alcohol used in the present invention, other well-known dispersants may also be used.

The above-described general formula is a formula showing a case where the skeleton is entirely linear and no unsaturated bonds are included. The number of hydroxyl groups and hydrogen groups in the polyhydric alcohol may be somewhat less than the numbers represented in the general formula. In the above-described general formula, not only saturated bonds, but unsaturated bonds may also be included. While the basic skeleton may be linear or cyclic, linear is preferable. Although the effects of the present invention will be manifested if the number of hydroxyl groups is 50% or more of the carbon number "n", a larger number of hydroxyl groups is preferable. Most preferable is where the number of hydroxyl groups and the carbon number match. The additive amount of the polyhydric alcohol is from 0.05 to 5.0% by weight with respect to the powder to be loaded therewith, preferably from 0.1 to 3.0% by weight, and more preferable is from 0.3 to 2.0% by weight. Most of the added polyhydric alcohol is broken down and removed in the step of heat-treating compacted body carried out after the compacting step in a magnetic field. Any remaining polyhydric alcohol that was not broken down and removed during the step of heat-treating compacted body is broken down and removed in the subsequent sintering step.

Compacting Step in a Magnetic Field

The compacting step in a magnetic field can be conducted either by dry compacting or by wet compacting. However, to increase the degree of magnetic orientation, it is preferable to conduct by wet compacting. Therefore, the preparation of a slurry for wet compacting will be explained below, and then the compacting step in a magnetic field will be explained.

In the case of employing wet compacting, the second fine milling step is carried out by wet milling, and the obtained slurry is concentrated to prepare the slurry for wet compacting. The concentrating can be carried out by centrifugal separation or using a filter press, for instance. During this stage, the ferrite magnet powder preferably makes up from 30 to 80% by weight of the slurry for wet compacting.

Next, the slurry for wet compacting is subjected to compacting in a magnetic field. The compacting pressure may be set between approximately 0.1 and 0.5 ton/cm$^2$, and the applied magnetic field may be set between approximately 5 and 15 kOe. As a dispersion medium, not only water but also non-aqueous media may be used. When a non-aqueous dispersion medium is used, organic solvents such as toluene or xylene can be used. When toluene or xylene is used as a non-aqueous dispersion medium, surfactants such as oleic acid are preferably added.

Step of Heat-Treating Compacted Body

In this step, the compacted body undergoes heat treatment by being retained at a low temperature between 100° C. and 450° C., and more preferably between 200° C. and 350° C., for 1 to 4 hours. By performing this heat treatment in the air, $Fe^{2+}$ is partially oxidized to $Fe^{3+}$. That is, in the present step, a reaction of converting $Fe^{2+}$ into $Fe^{3+}$ is allowed to progress to a certain extent, so as to regulate the amount of $Fe^{2+}$ to a given amount.

In the case of obtaining Zn W-type ferrite, this step of heat-treating compacted body is not necessary.

Sintering Step

In the subsequent sintering step, the compacted body undergoes sintering by being retained at a temperature between 1100° C. and 1270° C., and more preferably between 1160° C. and 1240° C., for 0.5 to 3 hours. Such sintering is carried out in a non-oxidative atmosphere for the same reason as mentioned in the calcining step. Further, in this step the carbon powder added prior to the second fine milling step is eliminated.

In the case of obtaining Zn W-type ferrite, air may be used as the sintering atmosphere.

By undergoing the above-described steps, the W-type ferrite sintered magnet according to the present invention can be obtained.

Among W-type ferrite sintered magnets, a $Fe_2$ W-type ferrite sintered body, if comprising an Al constituent and/or comprising a W constituent, can achieve both a residual magnetic flux density (Br) of 4.0 kG or more and a coercive force (HcJ) of 3.0 kOe or more. In the case of comprising a Ce constituent and/or comprising an Mo constituent, a residual magnetic flux density (Br) of 4.6 kG or more and a coercive force (HcJ) of 3.3 kOe or more can be achieved. In the case of comprising a Ga constituent, a residual magnetic flux density (Br) of 4.0 kG or more and a coercive force (HcJ) of 3.5 kOe or more can be achieved.

Moreover, among W-type ferrite sintered magnets, a Zn W-type ferrite sintered magnet comprising a Ga constituent enables a coercive force (HcJ) of 700 Oe or more, and even of 720 Oe or more, while maintaining a residual magnetic flux density (Br) of 4.5 kG or more, and even of 4.8 kG, to be obtained without requiring any complex atmospheric control.

The present invention can also be utilized as a ferrite magnet powder by milling the obtained W-type ferrite sintered magnet. This ferrite magnet powder can be used in a bonded magnet.

While the production method of a ferrite sintered magnet has been explained in the above, the same steps can be employed as appropriate when producing a ferrite magnet powder. The ferrite magnet powder according to the present invention can be prepared by two processes, one by fabricating from a calcined body, and the other by fabricating from a sintered body.

In the case of fabricating from a calcined body, the first additive (Ca constituent, Si constituent) and second additive (Al constituent, Ce constituent, Mo constituent and Ga constituent) are added prior to the calcining step. A calcined body in which these have been added undergoes pulverizing, powder heat treatment, and milling to yield a ferrite magnet powder. This ferrite magnet powder can be implemented as a ferrite magnet powder after undergoing the above-described heat treatment. For example, a bonded magnet can be prepared using a ferrite magnet powder which has undergone the powder heat treatment. In addition to being used in a bonded magnet, this ferrite magnet powder can also be used in ferrite sintered magnet fabrication. Therefore, during the production steps of a ferrite sintered magnet, ferrite magnet powder can also be produced. However, in some cases the particle size will be different for the case of using in a bonded magnet and that of using in a ferrite sintered magnet.

In the case of fabricating the ferrite magnet powder from a ferrite sintered magnet, the first additive (Ca constituent, Si constituent) and second additive (Al constituent, Ce constituent, Mo constituent and Ga constituent) can be added at any stage prior to the sintering step. The ferrite magnet powder can be prepared by appropriately milling the ferrite sintered magnet obtained from the above-described steps.

As described above, a ferrite magnet powder encompasses the forms of calcined powder, powder which is milled after undergoing calcining and sintering, and powder which is heat treated after being calcined and milled.

EXAMPLE 1

Specific examples of the present invention will now be explained.

Example 1 (Example 1-1, Example 1-2, Example 1-3, Example 1-4, Example 1-5)

Example 1-1 is an example wherein an Al constituent was added as an additive, Example 1-2 is an example wherein a W constituent was added as an additive, Example 1-3 is an example wherein a Ce constituent was added as an additive, and Example 1-4 is an example wherein a Mo constituent was added as an additive.

EXAMPLE 1-1

Ferrite sintered magnets were prepared in accordance with the following procedures.

$Fe_2O_3$ powder (primary particle size: 0.3 µm) and $SrCO_3$ powder (primary particle size: 2 µm) were prepared as raw material powders. These raw material powders were weighed out so that the values of "a", "b" in the above formula 1 were finally as given in FIG. 1. It is noted that in formula 1 $Fe^{2+}$ is formed from calcining; i.e. although "a" is 0 during mixing, the weighed amount of $Fe_2O_3$ powder took into consideration the amount that would turn into "a" after calcining.

After being weighed out, the powders were blended and crushed using a wet ball mill for 16 hours. Subsequently, the crushed powders were dried, and the particle size thereof was then regulated. Thereafter, the powders were calcined in a nitrogen gas atmosphere at 1350° C. for 1 hour, so as to obtain a powdery calcined body. The calcined body was pulverized with a dry vibration mill for 10 minutes, so as to obtain a coarse powder having a mean particle size of 1 µm.

Thereafter, $CaCO_3$ powder (primary particle size: 1 µm), $SiO_2$ powder (primary particle size: 0.01 µm), and $Al_2O_3$ powder (primary particle size: 0.5 µm) were added to these coarse powders in the amount shown in FIG. 1. The resulting mixtures were then wet milled with a ball mill for 40 hours, whereby slurries were obtained. It is noted that the amount of calcined powder contained in the slurries was 33% by weight. After the completion of milling, the slurries were concentrated in a centrifugal separator, so as to prepare a slurry for wet compacting. These slurries for wet compacting were then subjected to compacting in a magnetic field. The applied magnetic field (vertical magnetic field) was 12 kOe (1000 kA/m), and the compacted bodies had a cylindrical form with a diameter of 30 mm and a height of 15 mm.

These compacted bodies were subjected to a heat treatment by retaining in air at 250° C. for 3 hours. The resulting bodies were then sintered in a nitrogen gas atmosphere at a temperature rising rate of 5° C./minute at a maximum temperature of 1200° C. for 1 hour, so as to obtain sintered bodies. The composition of the obtained sintered bodies was determined with a fluorescent X-ray quantitative analyzer SIMULTIX 3550 manufactured by Rigaku Corporation (this is the same for the below Examples as well).

Next, the top and bottom surfaces of the obtained sintered bodies were processed. Magnetic properties were then evaluated in the following manner using a BH tracer having a maximum applied magnetic field of 25 kOe. The results are shown in FIGS. 1 to 4.

FIGS. 1 and 2 show that when the value of "a" is 2.0, $CaCO_3$ is 1.0% by weight, $SiO_2$ is 0.5% by weight and $Al_2O_3$ is 0.5% by weight, the decrease in coercive force (HcJ) is dramatic when the value of "b" is less than 13.0, and that the decrease in residual magnetic flux density (Br) is dramatic when the value of "b" is 16.4 or more. In contrast, if the value of "b" is in the range of 13.0 to 16.2, a coercive force (HcJ) of 3 kOe or more and a residual magnetic flux density (Br) of 4.4 kG or more is attainable.

Figure 3:
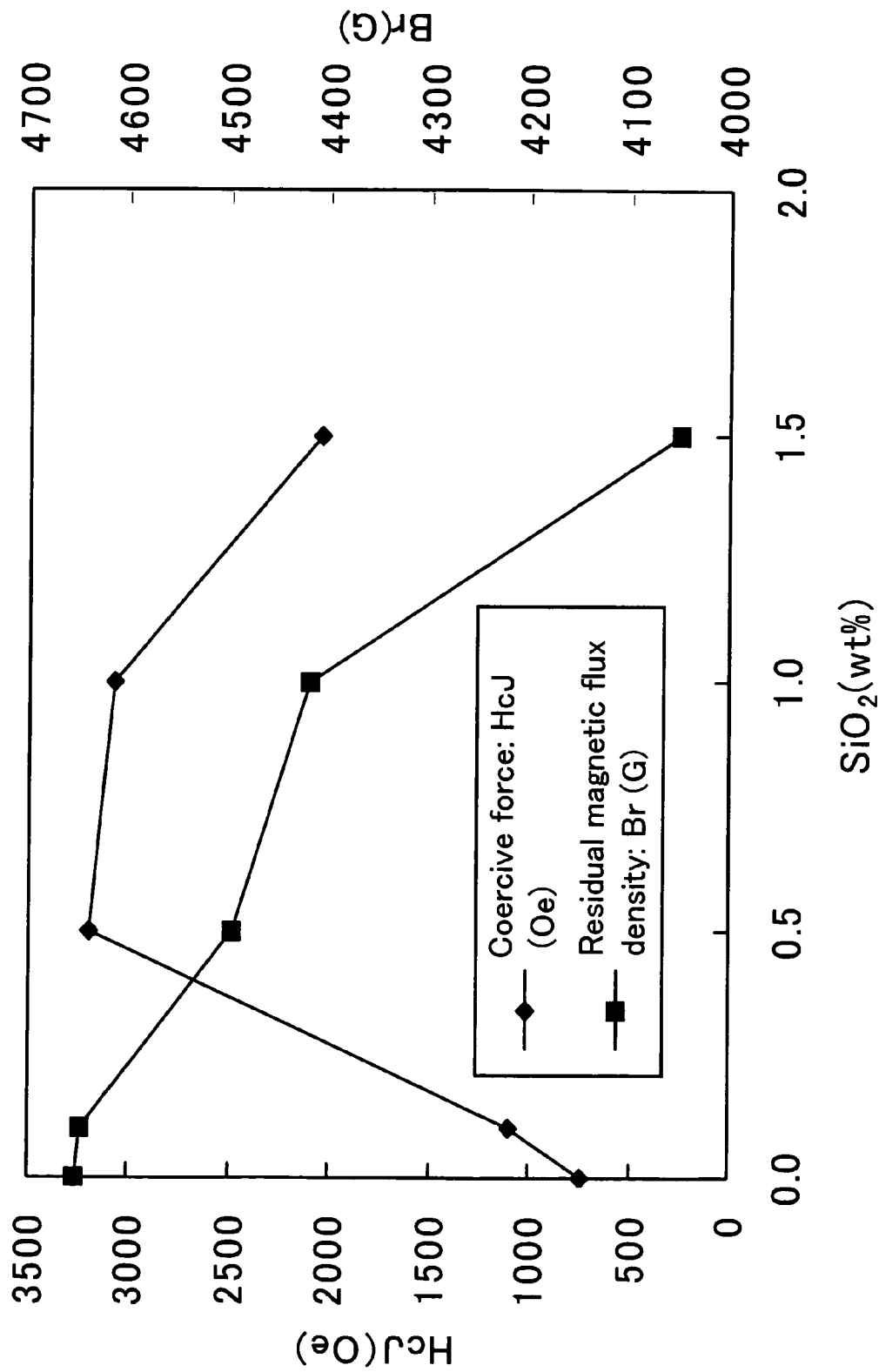
FIG. 3 is a graph showing the relationship between $SiO_2$ amount of the sintered body having a main composition represented by $SrFe^{2+}_aFe^{3+}_bO_{27}$ (wherein a=1.9, and b=16.2), coercive force (HcJ) and residual magnetic flux density (Br)

FIGS. 1 and 3 show that when the value of "a" is 1.9, the value of "b" is 16.2, $CaCO_3$ is 1.0% by weight, and $Al_2O_3$ is 0.3% by weight, the decrease in coercive force (HcJ) is dramatic when $SiO_2$ is less than 0.5% by weight, and that the decrease in coercive force (HcJ) and residual magnetic flux density (Br) is dramatic when $SiO_2$ is 1.5% by weight or more. In contrast, if $SiO_2$ is in the range of 0.5 to 1.0% by weight, a coercive force (HcJ) of 3 kOe or more and a residual magnetic flux density (Br) of 4.4 kG or more is attainable.

Figure 4:
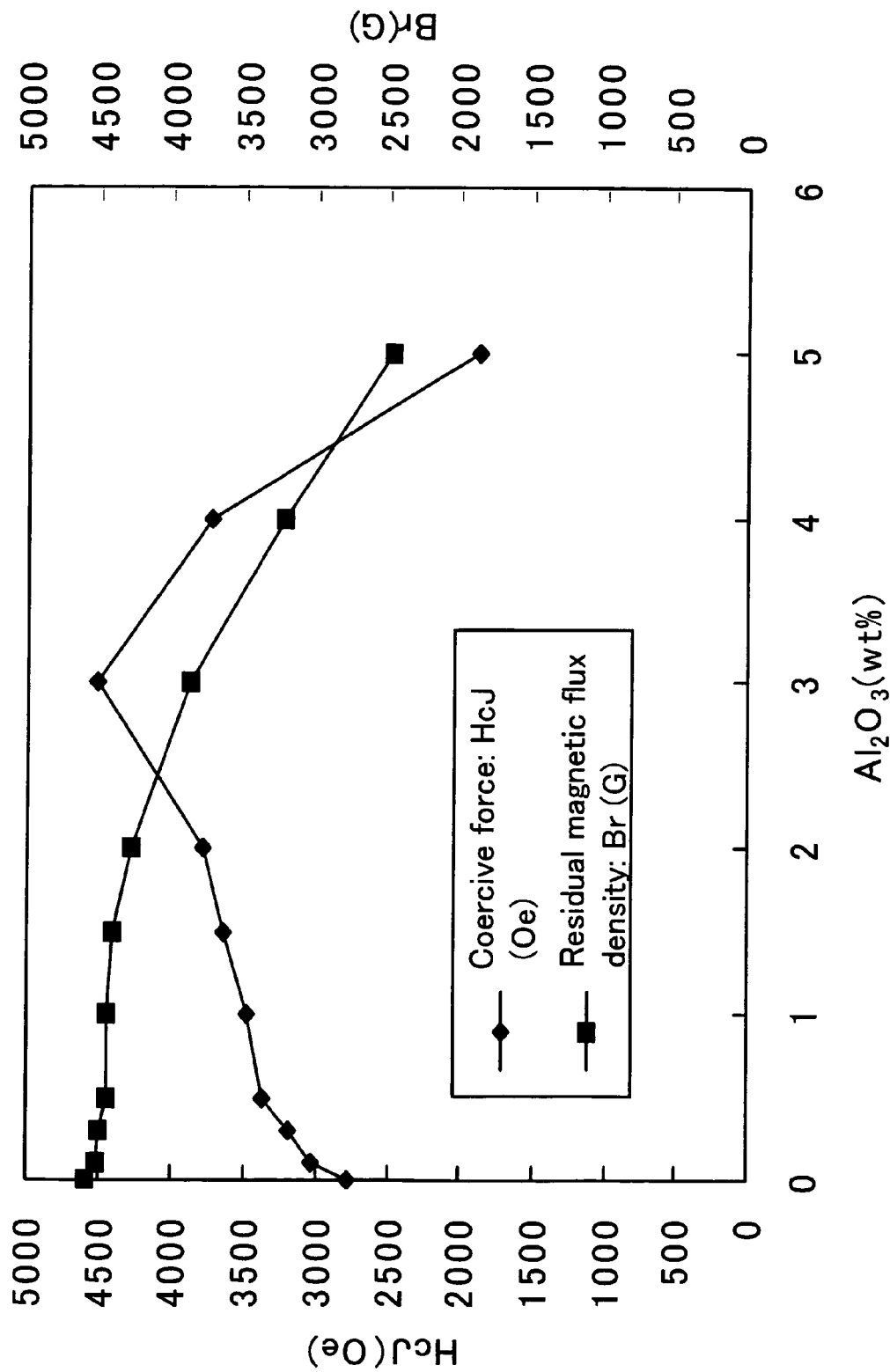
FIG. 4 is a graph showing the relationship between $Al_2O_3$ amount of the sintered body having a main composition represented by $SrFe^{2+}_aFe^{3+}_bO_{27}$ (wherein a=2.1, and b=15.8), coercive force (HcJ) and residual magnetic flux density (Br)

Next, FIGS. 1 and 4 show that when the value of "a" is 2.1, the value of "b" is 15.8, $CaCO_3$ is 1.0% by weight, and $SiO_2$ is 0.5% by weight, coercive force (HcJ) can be varied by the addition of $Al_2O_3$. Especially, even though coercive force could only be improved to about 2.8 kOe with just $CaCO_3$ and $SiO_2$, by adding $Al_2O_3$, a coercive force (HcJ) exceeding 4 kOe can be achieved. However, if too much $Al_2O_3$ is added, the decrease in residual magnetic flux density (Br) is dramatic. Therefore, in the present invention, the Al constituent is set at between 0.01 and 1.5% by weight in terms of $Al_2O_3$. If the $Al_2O_3$ is within the range of 0.1 to 1.5% by weight, a coercive force (HcJ) of 3 kOe or more and a residual magnetic flux density (Br) of 4.4 kG or more is attainable while having W phase as the main phase.

EXAMPLE 1-2

Calcined bodies were obtained under the same conditions as in Example 1-1, except that the $Fe_2O_3$ powder (primary particle size: 0.3 μm) and $SrCO_3$ powder (primary particle size: 2 μm) were weighed out so that the values of "a", "b" in the above formula 1 were finally as given in FIG. 5, to thereby yield coarse powders having a mean particle size of 1 μm.

Sintered bodies were obtained under the same conditions as in Example 1-1, except that $CaCO_3$ powder (primary particle size: 1 μm), $SiO_2$ powder (primary particle size: 0.01 μm), and $WO_3$ powder (primary particle size: 0.5 μm) were added to these coarse powders in the amount shown in FIG. 5. Magnetic properties were evaluated under the same conditions as in Example 1-1, and these results are shown in FIGS. 5 to 8.

Figure 6:
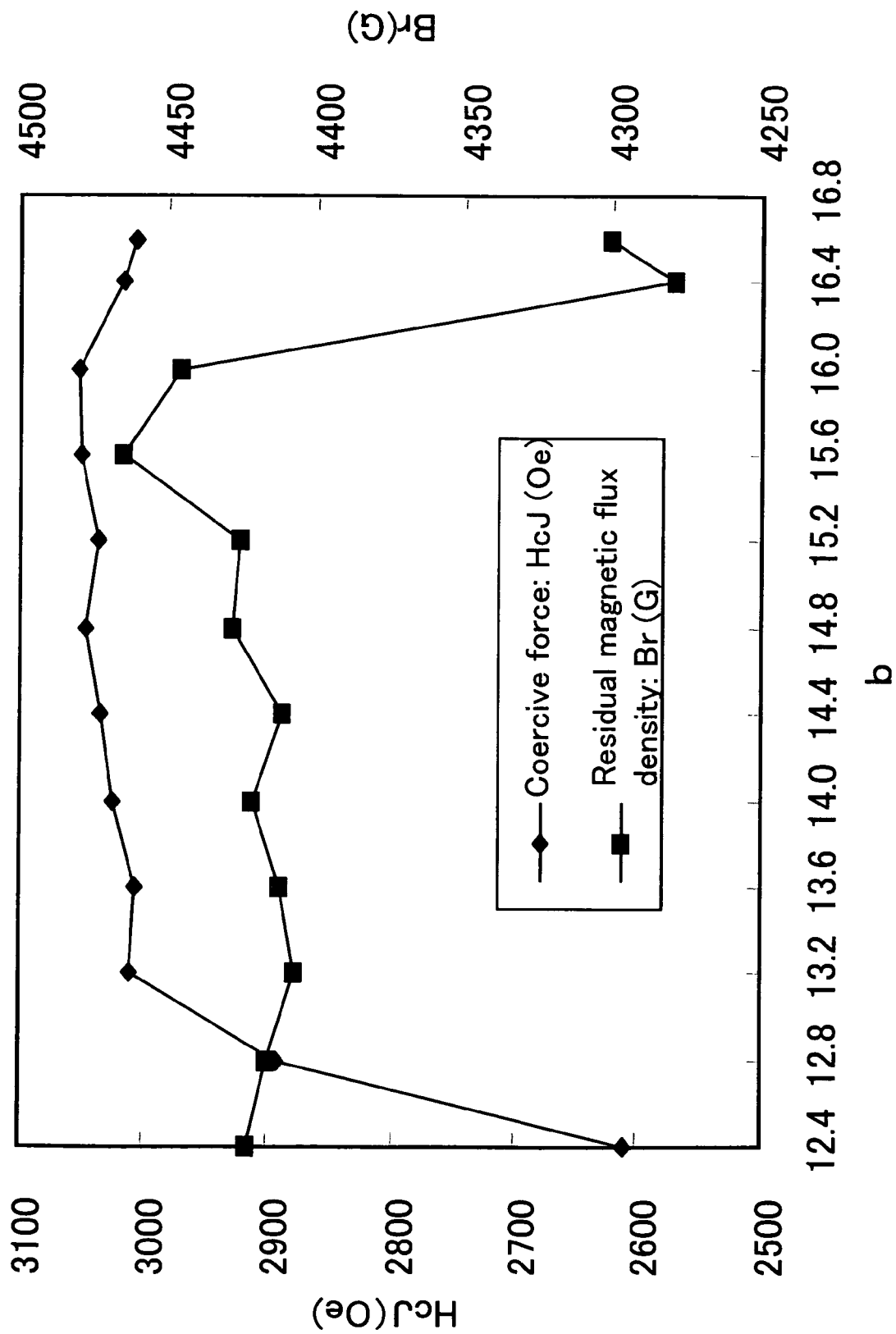
FIG. 6 is a graph showing the relationship between "b" of the sintered body having a main composition represented by $SrFe^{2+}_aFe^{3+}_bO_{27}$ (wherein a=2.0, and b=12.4 to 16.6), coercive force (HcJ) and residual magnetic flux density (Br)

FIGS. 5 and 6 show that when the value of "a" is 2.0, $CaCO_3$ is 0.7% by weight, $SiO_2$ is 0.45% by weight and $WO_3$ is 0.1% by weight, the decrease in coercive force (HcJ) is dramatic when the value of "b" is less than 13.2, and that the decrease in residual magnetic flux density (Br) is dramatic when the value of "b" is 16.4 or more. In contrast, if the value of "b" is in the range of 13.2 to 16.2, a coercive force (HcJ) of 3 kOe or more and a residual magnetic flux density (Br) of 4.4 kG or more is attainable.

Figure 7:
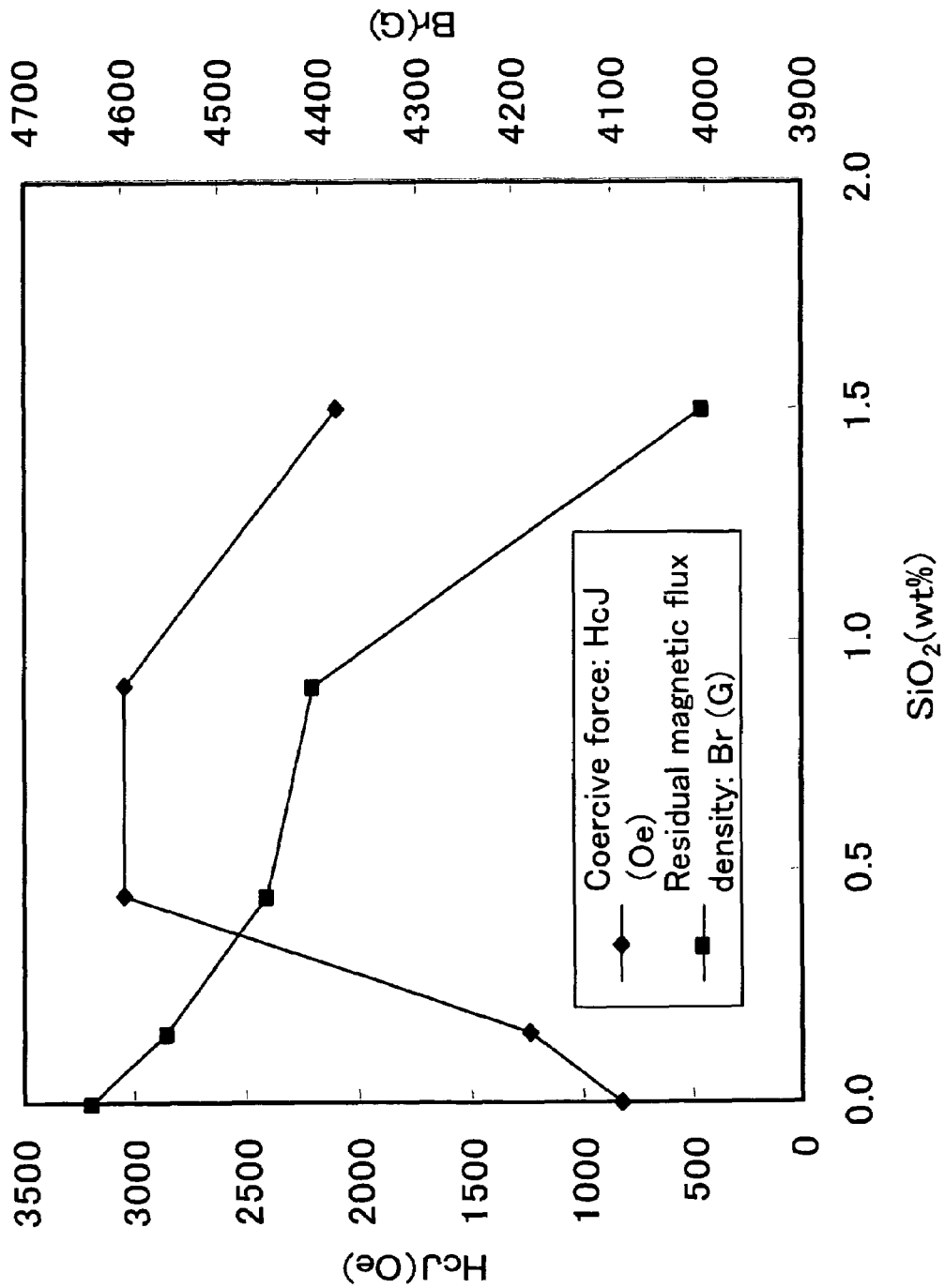
FIG. 7 is a graph showing the relationship between $SiO_2$ amount of the sintered body possessing a main composition represented by $SrFe^{2+}_aFe^{3+}_bO_{27}$ (wherein a=1.9, and b=16.2), coercive force (HcJ) and residual magnetic flux density (Br)

FIGS. 5 and 7 show that when the value of "a" is 1.9, the value of "b" is 16.2, $CaCO_3$ is 0.7% by weight, and $WO_3$ is 0.1% by weight, the decrease in coercive force (HcJ) is dramatic when $SiO_2$ is less than 0.45% by weight, and that the decrease in coercive force (HcJ) and residual magnetic flux density (Br) is dramatic when $SiO_2$ is 1.50% by weight or more. In contrast, if $SiO_2$ is in the range of 0.45 to 0.90% by weight, a coercive force (HcJ) of 3 kOe or more and a residual magnetic flux density (Br) of 4.4 kG or more is attainable.

Figure 8:
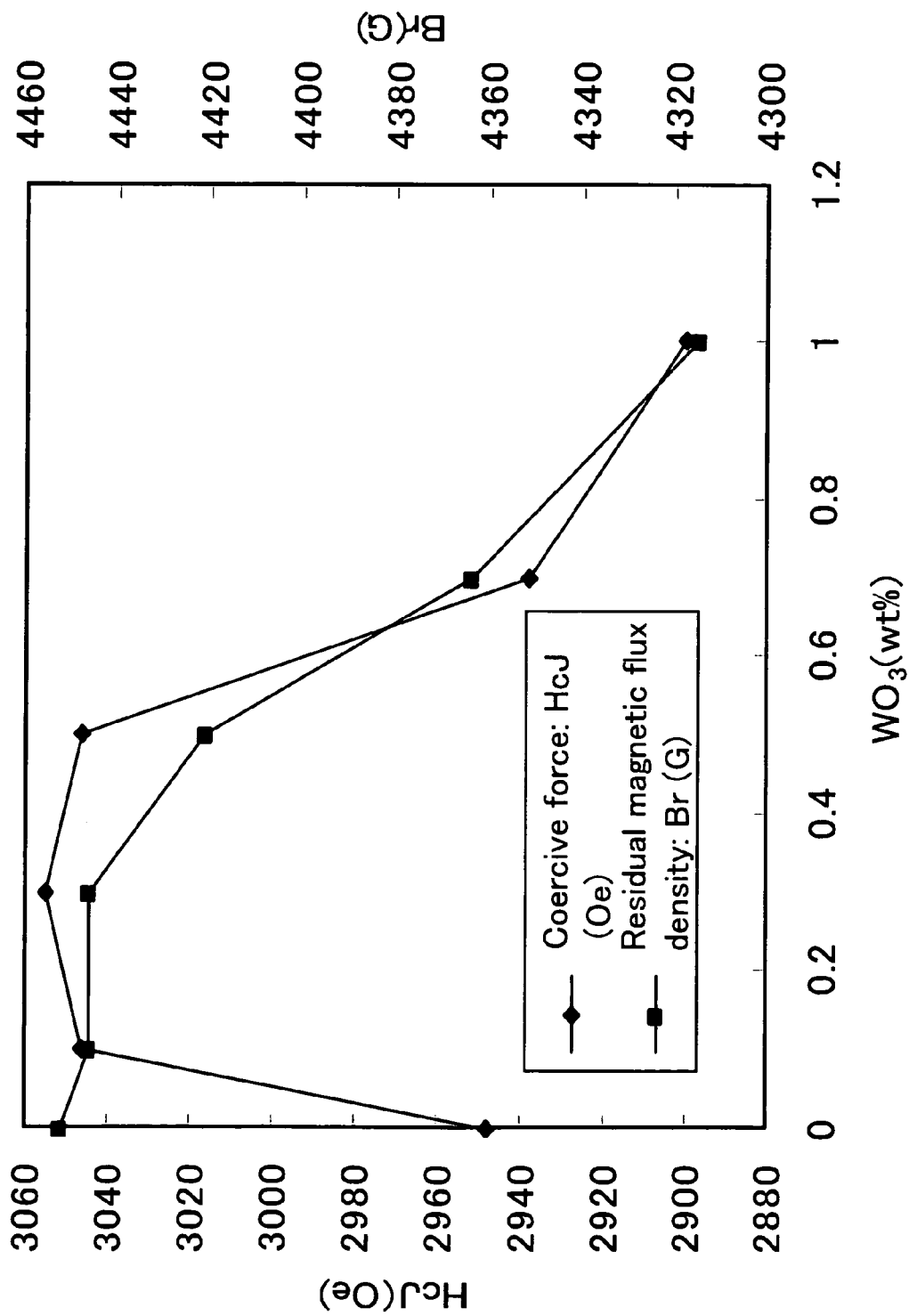
FIG. 8 is a graph showing the relationship between $WO_3$ amount of the sintered body having a main composition represented by $SrFe^{2+}_aFe^{3+}_bO_{27}$ (wherein a=2.0, and b=16.0), coercive force (HcJ) and residual magnetic flux density (Br)

Next, FIGS. 5 and 8 show that when the value of "a" is 2.0, the value of "b" is 16.0, $CaCO_3$ is 0.7% by weight, and $SiO_2$ is 0.45% by weight, coercive force (HcJ) can be improved by the addition of $WO_3$. Especially, even though a coercive force of less than 3.0 kOe could be attained with just $CaCO_3$ and $SiO_2$, a coercive force (HcJ) more than 3 kOe is attainable by adding $WO_3$. However, if too much $WO_3$ is added, the decrease in residual magnetic flux density (Br) is dramatic. Therefore, in the present invention, the W constituent is set at between 0.01 and 0.6% by weight in terms of $WO_3$. If the $WO_3$ is within the range of 0.01 to 0.6% by weight, a coercive force (HcJ) of 3 kOe or more and a residual magnetic flux density (Br) of 4.4 kG or more is attainable.

EXAMPLE 1-3

Calcined bodies were obtained under the same conditions as in Example 1-1, except that the $Fe_2O_3$ powder (primary particle size: 0.3 μm) and $SrCO_3$ powder (primary particle size: 2 μm) were weighed out so that the values of "a", "b" in the above formula 1 were finally as given in FIG. 9, to thereby yield coarse powders having a mean particle size of 1 μm.

Next, the coarse powders were milled. The milling was carried out in two stages using a ball mill. In the first milling, 400 ml of water was added per 210 g of coarse powder, and the resulting mixtures were then milled for 88 hours. After the first milling, the fine powders were heated in a nitrogen gas atmosphere and retained at 800° C. for 1 hour. The rate of temperature rise to the heating retention temperature and the rate of temperature fall from the heating retention temperature was set at 5° C./minute. Next, second milling was carried out by using a ball mill to perform wet milling for 25 hours, whereby a slurry for wet compacting was obtained. Prior to the second milling, 0.9% by weight of sorbitol (primary particle size: 10 μm), as well as $CaCO_3$ powder (primary particle size: 1 μm), $SiO_2$ powder (primary particle size: 0.01 μm), and $CeO_2$ powder (primary particle size: 0.8 μm), were added in the amount shown in FIG. 9 to the milled powders which had undergone the above-described heat treatment. The resulting mixtures were then wet milled with a ball mill for 40 hours, whereby slurries were obtained (the amount of calcined powder contained in the slurry was 33% by weight). Apart from these points, sintered bodies were obtained under the same conditions as in Example 1-1. Magnetic properties were evaluated under the same conditions as in Example 1-1, and these results are shown in FIGS. 9 to 12.

Figure 10:
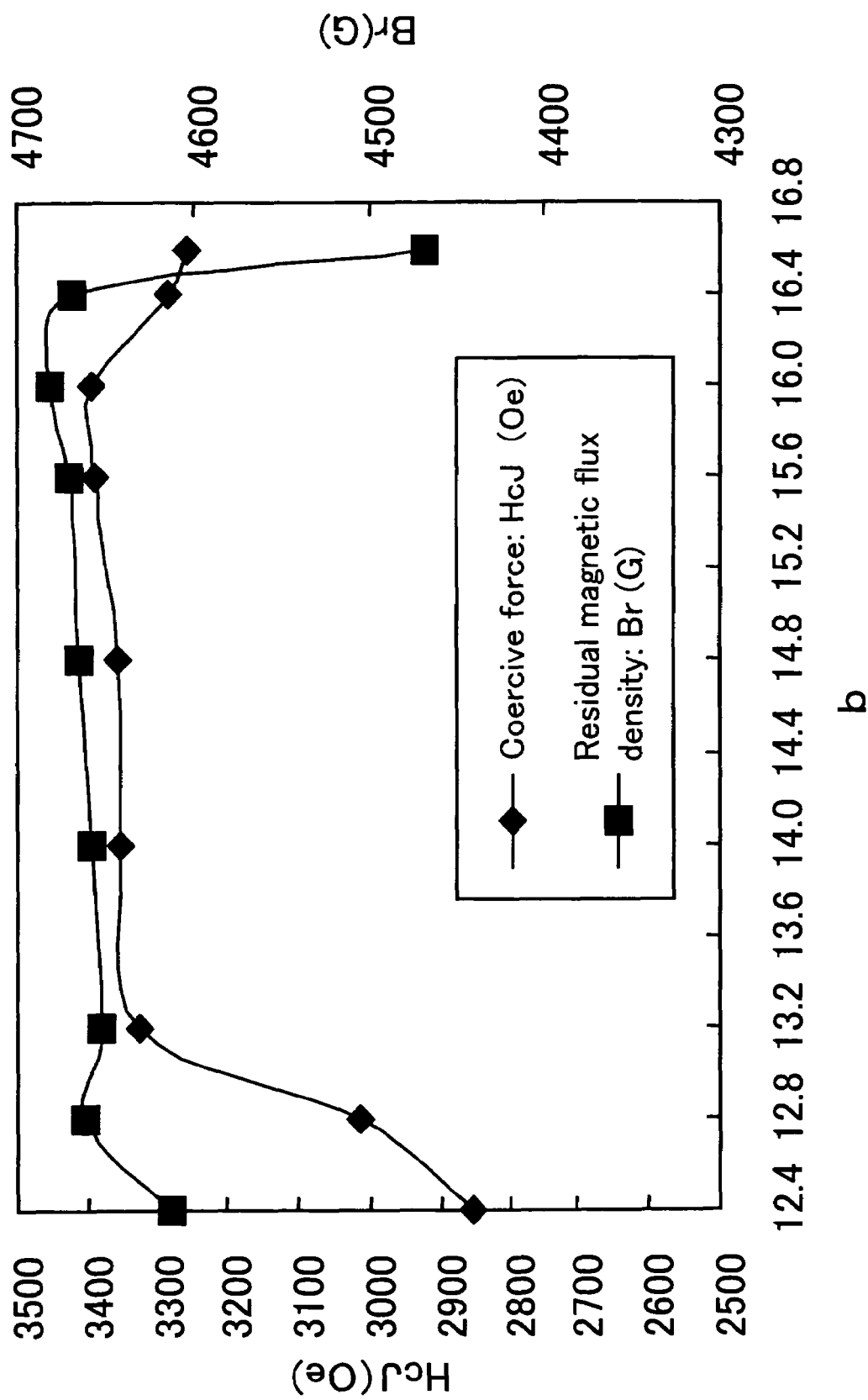
FIG. 10 is a graph showing the relationship between "b" of the sintered body having a main composition represented by $SrFe^{2+}_aFe^{3+}_bO_{27}$ (wherein a=2.0, and b=12.4 to 16.6), coercive force (HcJ) and residual magnetic flux density (Br)

FIGS. 9 and 10 show that when the value of "a" is 2.0, $CaCO_3$ is 0.7% by weight, $SiO_2$ is 0.6% by weight and $CeO_2$ is 0.1% by weight, the decrease in coercive force (HcJ) is dramatic if the value of "b" is too small, and that the decrease in residual magnetic flux density (Br) is dramatic if the value of "b" is too high. However, if the value of "b" is in the range of 12.9 to 16.3, a coercive force (HcJ) of 3.3 kOe or more and a residual magnetic flux density (Br) of 4.6 kG or more can be attained.

Figure 11:
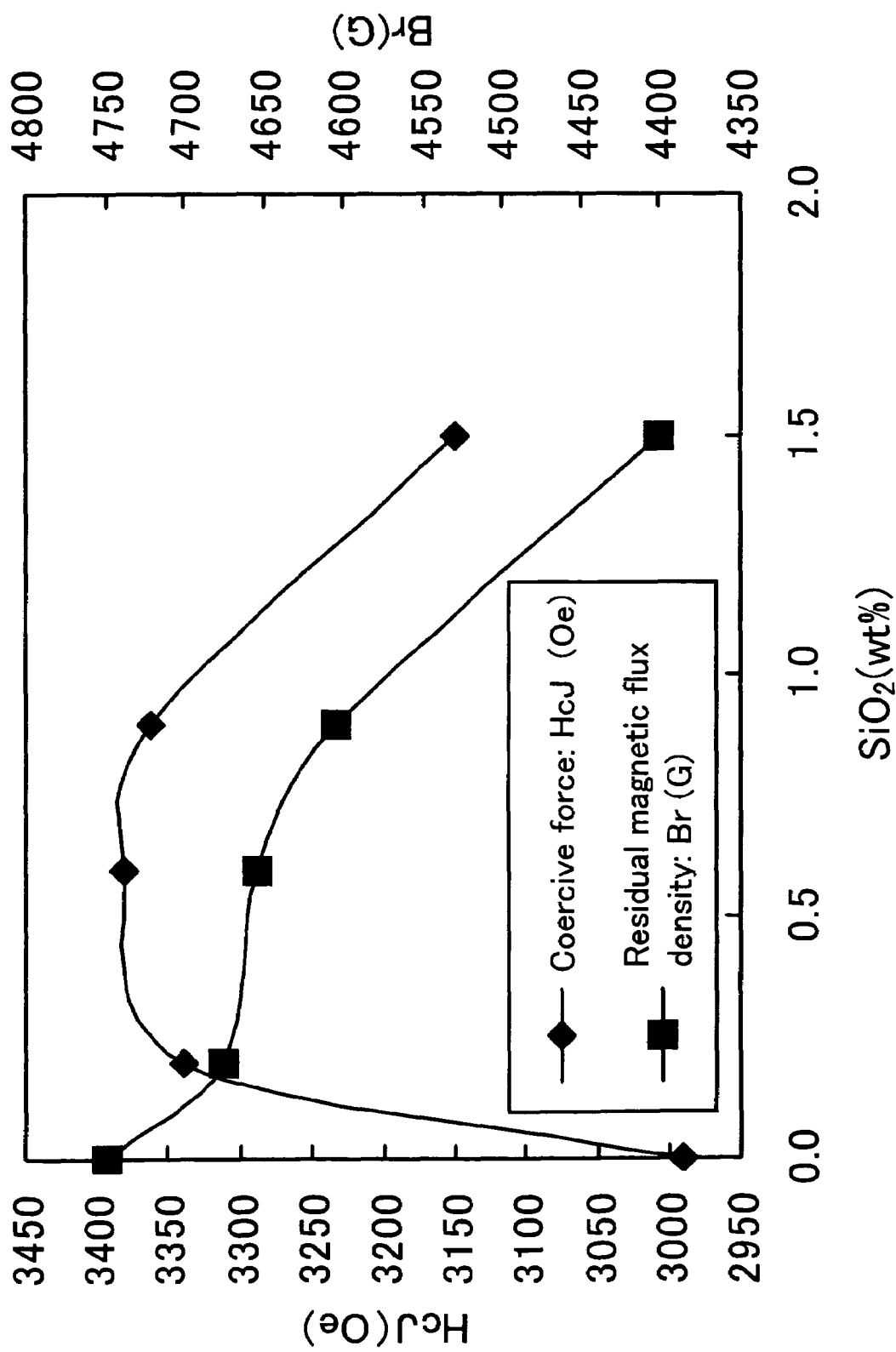
FIG. 11 is a graph showing the relationship between $SiO_2$ amount of the sintered body having a main composition represented by $SrFe^{2+}_aFe^{3+}_bO_{27}$ (wherein a=1.9, and b=16.2), coercive force (HcJ) and residual magnetic flux density (Br)

FIGS. 9 and 11 show that when the value of "a" is 1.9, the value of "b" is 16.2, $CaCO_3$ is 0.7% by weight, and $CeO_2$ is 0.1% by weight, the decrease in coercive force (HcJ) is dramatic if the amount of $SiO_2$ is too small, and that the decrease in coercive force (HcJ) and residual magnetic flux density (Br) is dramatic if the amount of $SiO_2$ is too high. However, if the amount of $SiO_2$ is in the range of 0.2 to 1.4% by weight, a coercive force (HcJ) of 3.3 kOe or more and a residual magnetic flux density (Br) of 4.6 kG or more can be attained.

Figure 12:
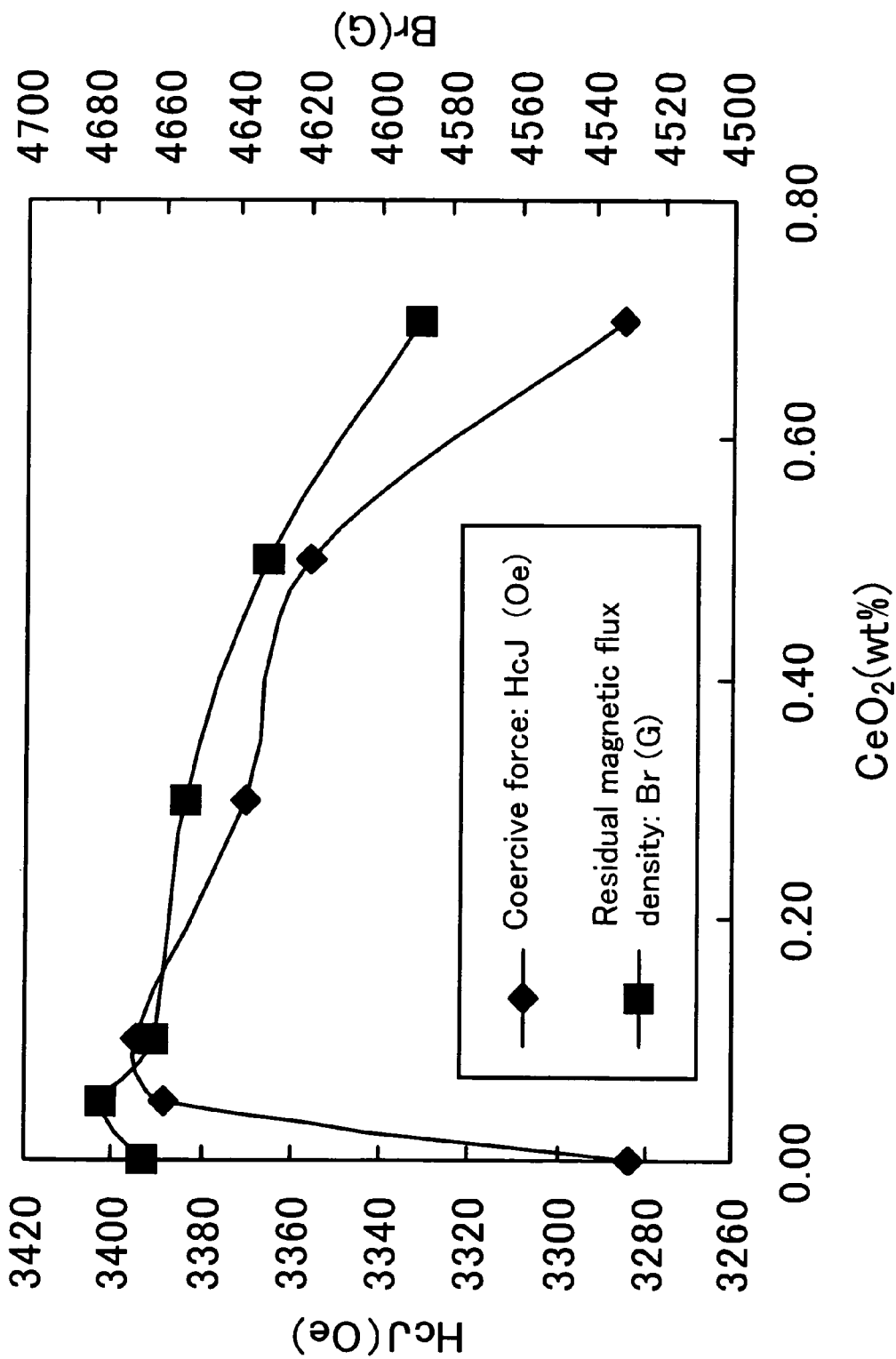
FIG. 12 is a graph showing the relationship between $CeO_2$ amount of the sintered body having a main composition represented by $SrFe^{2+}_aFe^{3+}_bO_{27}$ (wherein a=2.0, and b=16.0), coercive force (HcJ) and residual magnetic flux density (Br)

Next, FIGS. 9 and 12 show that when the value of "a" is 2.0, the value of "b" is 16.0, $CaCO_3$ is 0.7% by weight, and $SiO_2$ is 0.6% by weight, coercive force (HcJ) can be varied by the addition of $CeO_2$. Especially, if the amount of $CeO_2$ is in the range of 0.001 to 0.6% by weight, a coercive force (HcJ) of 3.3 kOe or more and a residual magnetic flux density (Br) of 4.6 kG or more is attainable.

EXAMPLE 1-4

Calcined bodies were obtained under the same conditions as in Example 1-1, except that the $Fe_2O_3$ powder (primary particle size: 0.3 μm) and $SrCO_3$ powder (primary particle size: 2 μm) were weighed out so that the values of "a", "b" in the above formula 1 were finally as given in FIG. 13, to thereby yield coarse powders having a mean particle size of 1 μm.

Next, milling was carried out in two stages using a ball mill under the same conditions as in Example 1-3. Sintered bodies were obtained under the same conditions as in Example 1-3, except that prior to the second milling, 0.9% by weight of sorbitol, and $CaCO_3$ powder (primary particle size: 1 μm), $SiO_2$ powder (primary particle size: 0.01 μm), and $MoO_3$ powder (primary particle size: 0.8 μm) in the amount shown in FIG. 13, were added. Magnetic properties were evaluated under the same conditions as in Example 1-1, and these results are shown in FIGS. 13 to 16.

Figure 14:
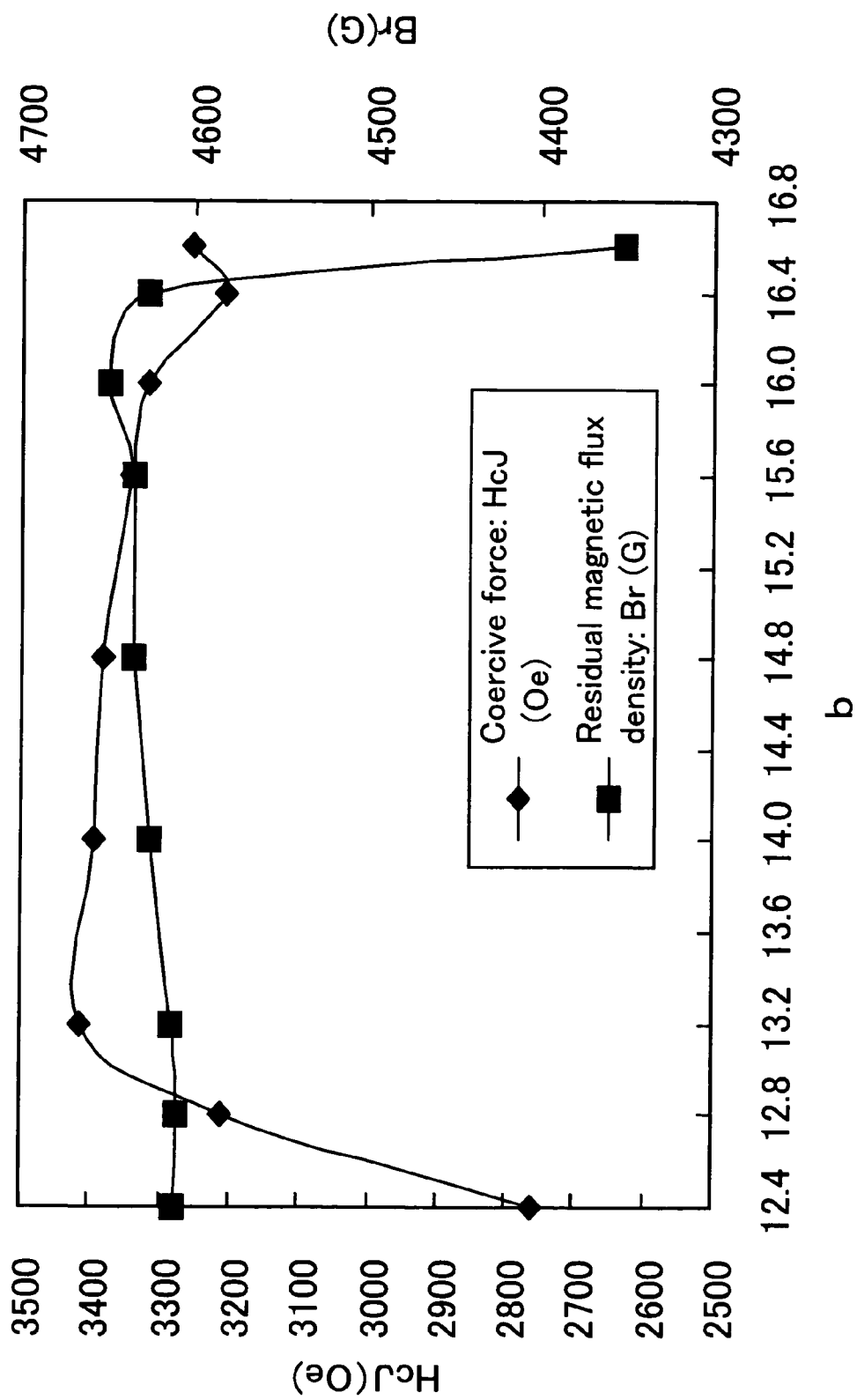
FIG. 14 is a graph illustrating the relationship between "b" of the sintered body having a main composition represented by $SrFe^{2+}_aFe^{3+}_bO_{27}$ (wherein a=2.0, and b=12.4 to 16.6), coercive force (HcJ) and residual magnetic flux density (Br)

FIGS. 13 and 14 show that when the value of "a" is 2.0, $CaCO_3$ is 0.7% by weight, $SiO_2$ is 0.6% by weight and $MoO_3$ is 0.02% by weight, the decrease in coercive force (HcJ) is dramatic if the value of "b" is too small, and that the decrease in residual magnetic flux density (Br) is dramatic if the value of "b" is too high. However, if the value of "b" is in the range of 12.9 to 16.3, a coercive force (HcJ) of 3.3 kOe or more and a residual magnetic flux density (Br) of 4.6 kG or more is attainable.

Figure 15:
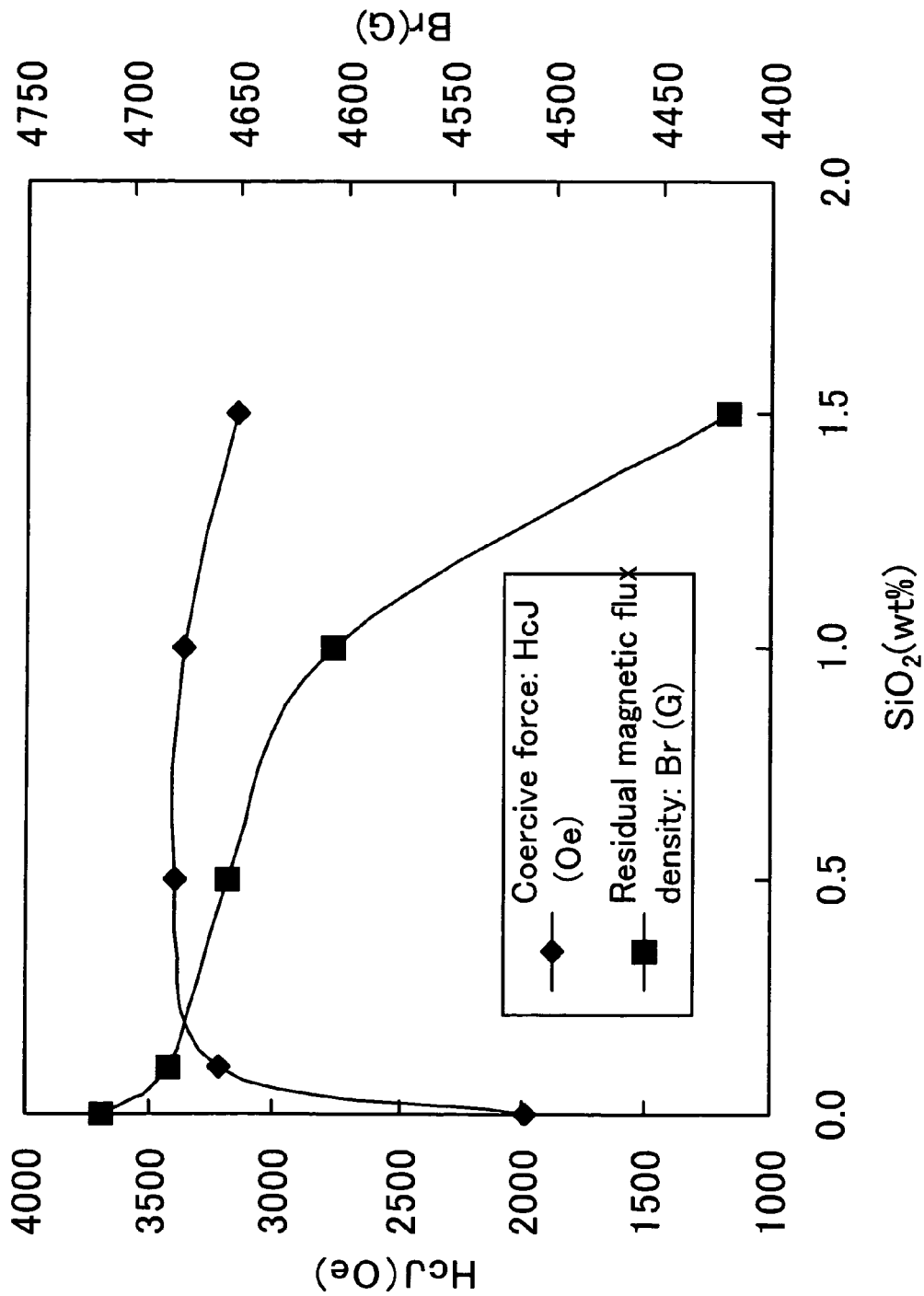
FIG. 15 is a graph showing the relationship between $SiO_2$ amount of the sintered body having a main composition represented by $SrFe^{2+}_aFe^{3+}_bO_{27}$ (wherein a=1.9, and b=16.2), coercive force (HcJ) and residual magnetic flux density (Br)

FIGS. 13 and 15 show that when the value of "a" is 1.9, the value of "b" is 16.2, $CaCO_3$ is 0.7% by weight, and $MoO_3$ is 0.02% by weight, the decrease in coercive force (HcJ) is dramatic if the amount of $SiO_2$ is too small, and that the decrease in coercive force (HcJ) and residual magnetic flux density (Br) is dramatic if the amount of $SiO_2$ is too high. However, if the amount of $SiO_2$ is in the range of 0.2 to 1.4% by weight, a coercive force (HcJ) of 3.3 kOe or more and a residual magnetic flux density (Br) of 4.6 kG or more is attainable.

Figure 16:
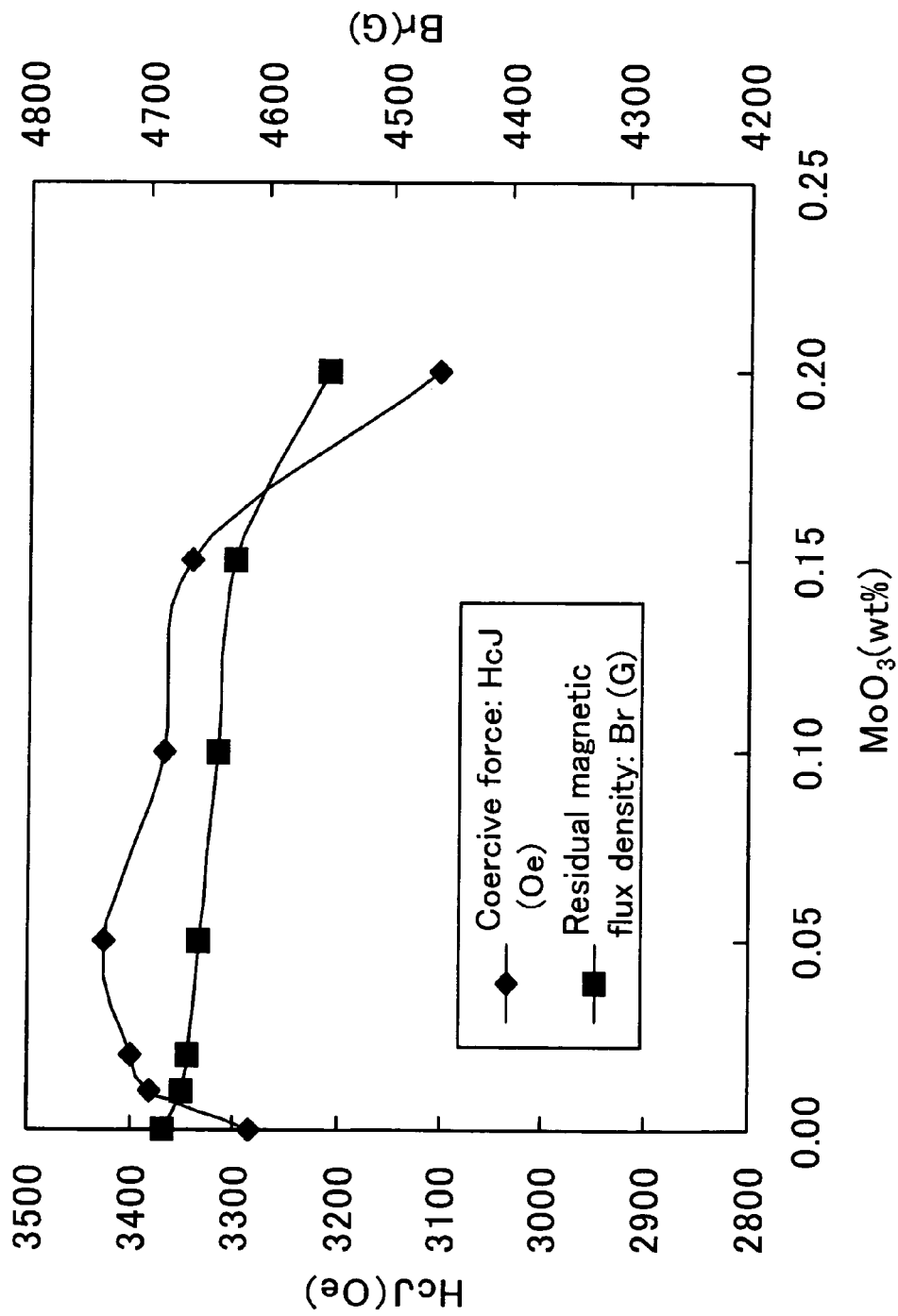
FIG. 16 is a graph showing the relationship between $MoO_3$ amount of the sintered body having a main composition represented by $SrFe^{2+}_aFe^{3+}_bO_{27}$ (wherein a=2.1, and b=15.8), coercive force (HcJ) and residual magnetic flux density (Br)

Next, FIGS. 13 and 16 show that when the value of "a" is 2.1, the value of "b" is 15.8, $CaCO_3$ is 0.7% by weight, and $SiO_2$ is 0.6% by weight, coercive force (HcJ) can be varied by the addition of $MoO_3$. Especially, if the amount of $MoO_3$ is in the range of 0.001 to 0.16% by weight, a coercive force (HcJ) of 3.3 kOe or more and a residual magnetic flux density (Br) of 4.6 kG or more is attainable.

As illustrated in Example 1-1, Example 1-2, Example 1-3, and Example 1-4, if $CaCO_3$, $SiO_2$, and the additives recommended in the present invention ($Al_2O_3$, $WO_3$, $CeO_2$, and $MoO_3$) are added, by specifying $CaCO_3$, $SiO_2$, the additive and "a" and "b" in the above-described composition formula 1, coercive force (HcJ) and residual magnetic flux density (Br) can both be achieved at a high level.

EXAMPLE 1-5

Sintered bodies were obtained under the same conditions as in Example 1-3, except that the additives recommended in the present invention ($Al_2O_3$, $WO_3$, $CeO_2$, and $MoO_3$) were added in combination. Magnetic properties were evaluated under the same conditions as in Example 1-1, and these results are shown in FIG. 13.

As shown in FIG. 13, both of coercive force (HcJ) and residual magnetic flux density (Br) were at a high level even when $Al_2O_3$, $WO_3$, $CeO_2$, and $MoO_3$ were added in various combinations.

The constituent phases of the obtained sintered bodies were observed by X-ray diffraction for the compositions shown in FIGS. 1, 5, 9 and 13. These results are shown in FIGS. 1, 5, 9 and 13.

As shown in FIG. 1, W phase was 70% or more in terms of molar ratio up to 1.5% by weight of $Al_2O_3$. When $Al_2O_3$ was 2.0% by weight or more, M phase and spinel phase (denoted as "S phase" in FIG. 1) were contained, and even when W phase was contained, it was less than 70% in terms of molar ratio.

As shown in FIGS. 5 and 9, regarding $WO_3$ and $CeO_2$, W phase was 70% or more in terms of molar ratio up to 0.5% by weight of their additive amount. When $WO_3$ was 0.7% by weight or more, a hematite phase (denoted as "H phase" in FIG. 5) or M phase were contained, and even when W phase was contained, it was less than 70% in terms of molar ratio.

As shown in FIG. 13, W phase was 70% or more in terms of molar ratio up to 0.15% by weight of $MoO_3$. When $MoO_3$ was 0.2% by weight or more, hematite phase (denoted as "H phase" in FIG. 13) was contained, and even when W phase was contained, it was less than 70% in terms of molar ratio.

The following conditions were applied to the X-ray diffraction:

X-ray generator: 3 kW
Tube voltage: 45 kV
Tube current: 40 mA
Sampling width: 0.02 deg
Scanning speed: 4.00 deg/min
Divergence slit: 1.00 deg
Scattering slit: 1.00 deg
Receiving slit: 0.30 mm The mean grain size of the sintered bodies obtained from the compositions shown in FIG. 17 was measured. The results are shown in FIG. 17. FIG. 17 shows that there is a relationship between additive amount and mean grain size, so that mean grain size can be varied by changing the additive amount. If the amount of the additives recommended in the present invention ($Al_2O_3$, $WO_3$, $CeO_2$, and $MoO_3$) is within the range according to the present invention, fine grains having a mean grain size of 0.8 μm or less, and even 0.6 μm or less, can be obtained. The "A" surface (surface containing the a axis and the c axis) of the sintered body was subjected to polishing and then acid-etching. SEM (scanning electron microscope) photographs were taken, and once each grain had been confirmed, the maximum diameter passing through the center of gravity for each grain was obtained from image analysis. This was taken as the sintered body grain size. The mean grain size was obtained by calculating the grain sizes of about 100 grains per sample, and taking the mean value of the grains from among all calculated grains.

COMPARATIVE EXAMPLE

Sintered bodies having the composition shown in FIG. 18 were prepared. Measurement of their magnetic properties showed that the properties of a coercive force (HcJ) of 3 kOe or more and a residual magnetic flux density (Br) of 4.4 kG or more were not achieved together.

As explained above, according to the present invention a ferrite magnetic material is obtained comprising an optimized composition that takes an additive into consideration, and which can achieve both a high level of coercive force (HcJ) and residual magnetic flux density (Br).

EXAMPLE 2

Example 2 (Example 2-1, Example 2-2, Example 2-3, and Example 2-4)

Example 2-1, Example 2-2 and Example 2-3 are examples wherein Sr and Ba were selected as element A, and, a Ga constituent was added as an additive. During mixing of the raw material powders, $CaCO_3$ powder was added in Example 2-1, although $CaCO_3$ powder was not added in Example 2-2. In Example 2-3, Sr was selected as element A, and the relationship between the value of "b" in the above-described formula 1 and magnetic properties was observed. Example 2-4 is an example wherein Sr and Ba were selected as element A, and a Ga constituent and an Al constituent were added in combination.

EXAMPLE 2-1

First, $Fe_2O_3$ powder (primary particle size: 0.3 μm) and $SrCO_3$ powder (primary particle size: 2 μm) and $BaCO_3$ powder (primary particle size: 0.05 μm) were prepared as raw material powders. These raw material powders were weighed out so that the mixed composition matched that as given in FIG. 19. Calcined bodies were then obtained under the same conditions as in Example 1-1, except that the mixed compositions were further added with 0.33% by weight of $CaCO_3$ powder (primary particle size: 1 μm), and the resulting mixtures were subjected to blending for 2 hours with a wet attritor, crushed and then retained for 1 hour under calcining conditions of 1300° C., to thereby obtain coarse powders having a mean particle size of 1 μm.

Next, milling was carried out in two stages using a ball mill under the same conditions as in Example 1-3, except that the type and amount of additives were set as below. During the second milling, 0.6% by weight of $SiO_2$ powder (primary particle size: 0.01 μm), 0.35% by weight of $CaCO_3$ powder (primary particle size: 1 μm), 0.7% by weight of $SrCO_3$ powder (primary particle size: 2 μm), 1.4% by weight of $BaCO_3$ powder (primary particle size: 0.05 μm), and 0.4% by weight of carbon powder (primary particle size: 0.05 μm), as well as 1.2% by weight of sorbitol (primary particle size: 10 μm) as a polyhydric alcohol, were added to the milled powders which had undergone the above-described heat treatment. The resulting mixtures were further added with 0 to 16.0% by weight of $Ga_2O_3$ powder (primary particle size: 2 μm).

The slurries obtained by undergoing the second milling was subjected to compacting in a magnetic field under the same conditions as in Example 1-1. These compacted bodies were subjected to a heat treatment at 300° C. for 3 hours in air. The resulting bodies were sintered in a nitrogen gas atmosphere at a temperature rising rate of 5° C./minute at a maximum temperature of 1190° C. for 1 hour, so as to obtain sintered bodies.

Next, the obtained sintered bodies were processed under the same conditions as in Example 1-1. Magnetic properties were then evaluated under the same conditions as in Example 1-1. The results are shown in FIGS. 19 to 21 corresponding to the additive amount of Ga constituent ($Ga_2O_3$ additive amount).

Figure 20:
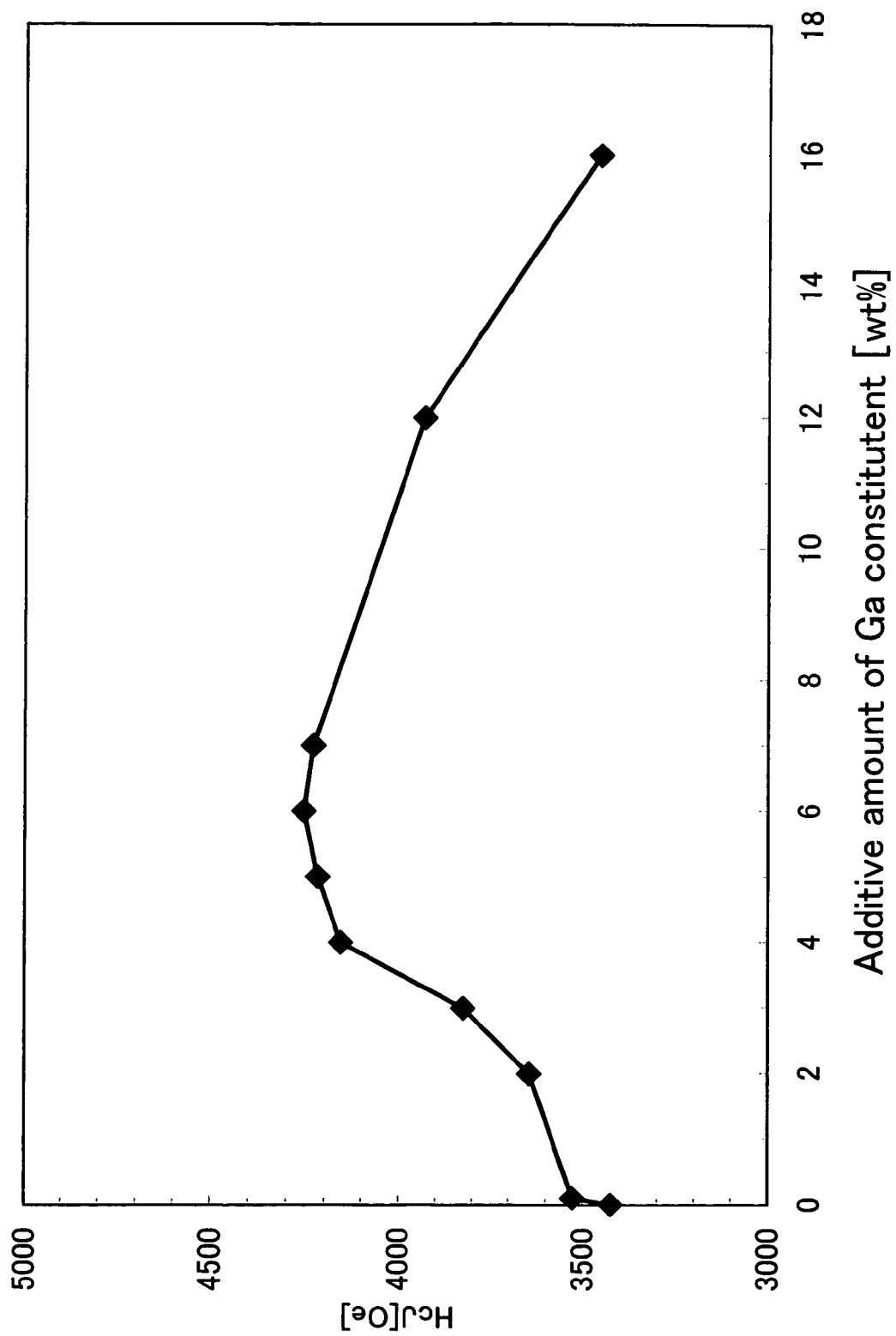
FIG. 20 is a graph showing the relationship between the additive amount of Ga constituent and coercive force (HcJ) in Example 2-1.
Figure 21:
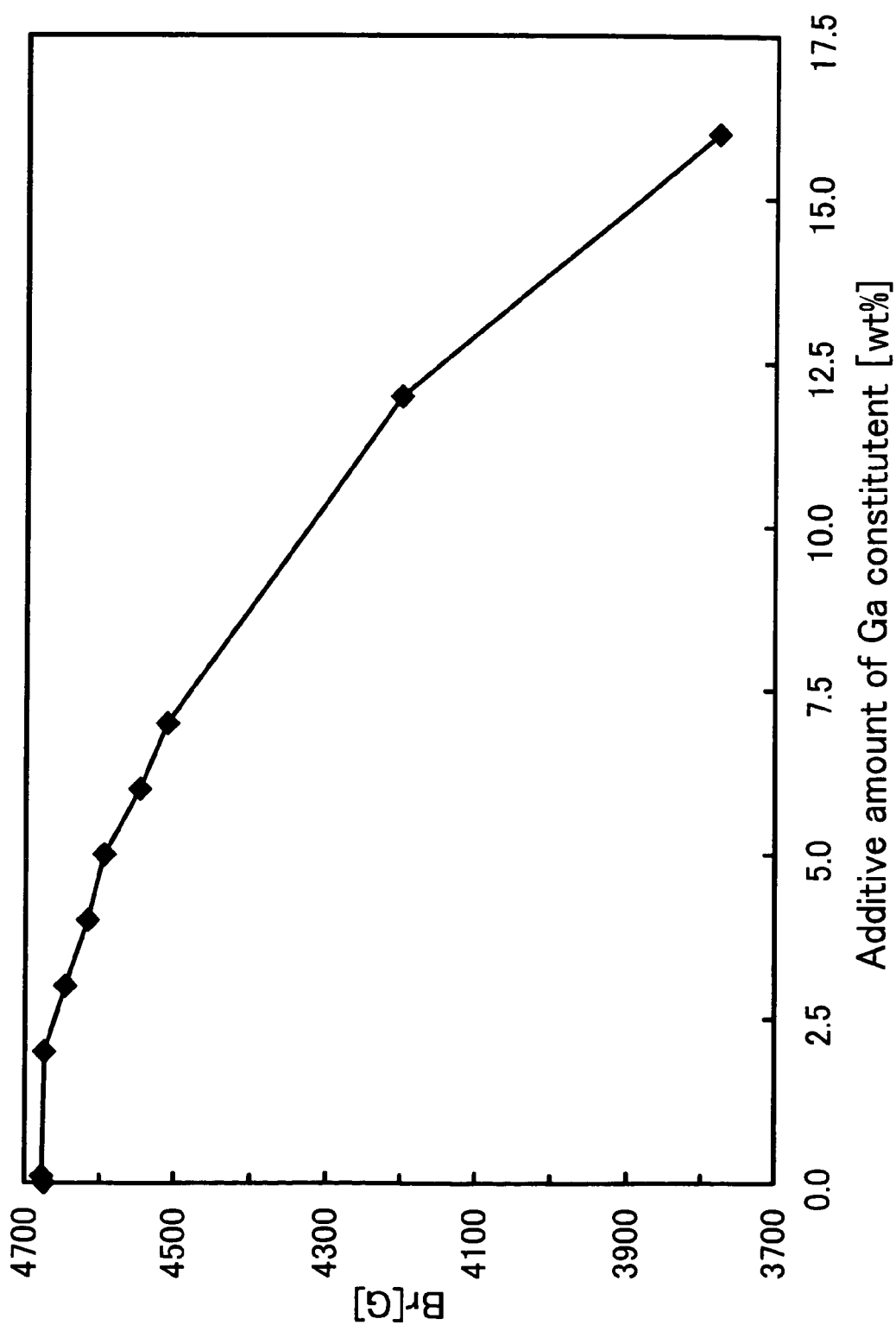
FIG. 21 is a graph showing the relationship between the additive amount of Ga constituent and residual magnetic flux density (Br) in Example 2-1.
Figure 22:
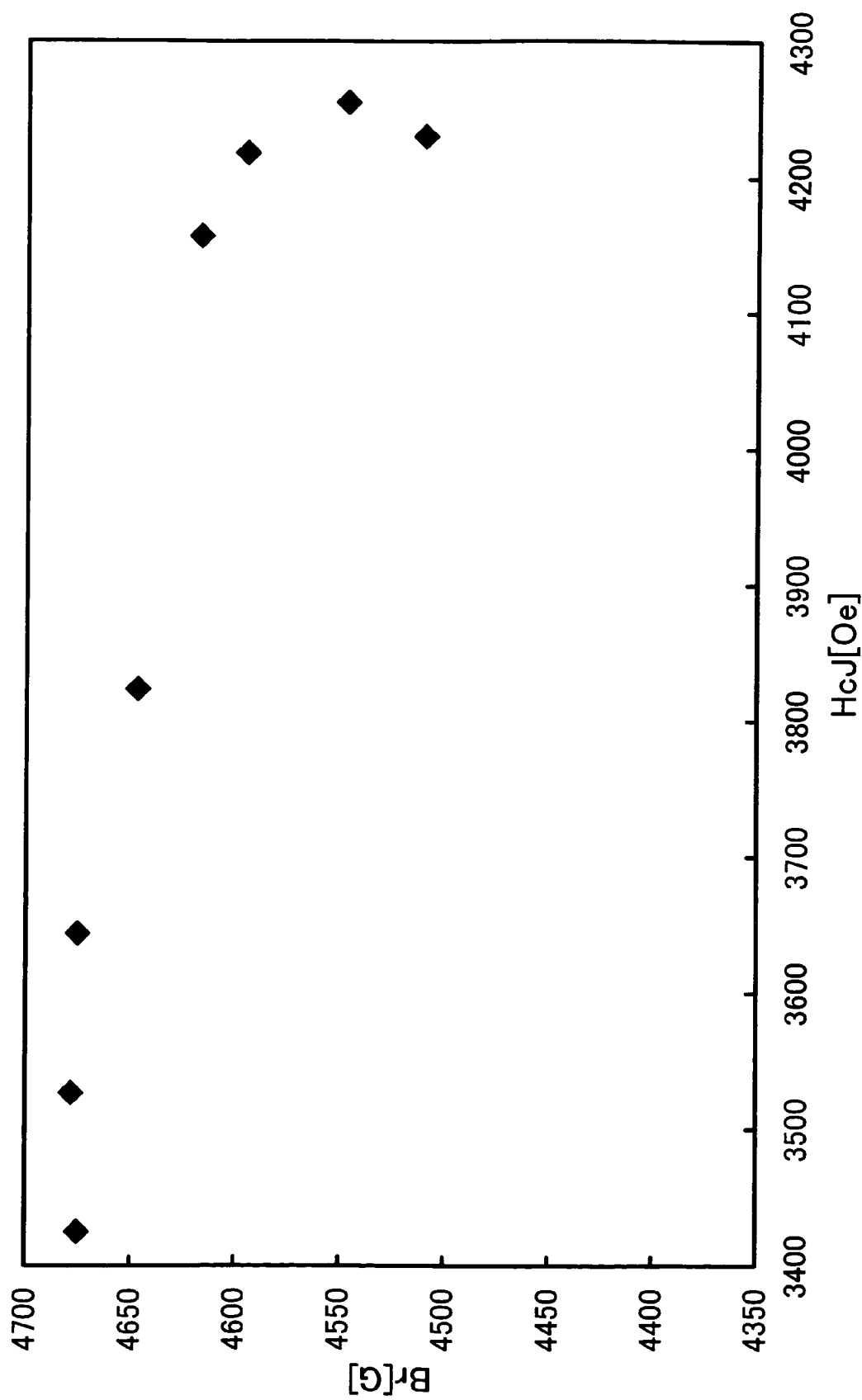
FIG. 22 is a graph showing the relationship between coercive force (HcJ) and residual magnetic flux density (Br) in Example 2-1.

FIG. 20 shows the relationship between the additive amount of Ga constituent and coercive force (HcJ), and FIG. 21 shows the relationship between the additive amount of Ga constituent and residual magnetic flux density (Br). FIG. 22 shows the relationship between coercive force (HcJ) and residual magnetic flux density (Br) for samples having from 0 to 6.0% by weight of the additive amount of Ga constituent.

FIG. 20 shows that coercive force (HcJ) improves by adding a Ga constituent. However, there is a peak in the effects of coercive force improvement by adding a Ga constituent, such that the additive amount of Ga constituent of 16% by weight exhibits the same coercive force (HcJ) as if no Ga constituent had been added.

Looking at FIG. 21, although residual magnetic flux density (Br) does decrease to under 3800 G when the additive amount of the Ga constituent is 16% by weight, when the Ga constituent is incorporated in a range of 15% by weight or less (excluding zero), a high residual magnetic flux density (Br) of 4000 G or even 4500 G, is attained.

From the above, the additive amount of Ga constituent in the present invention is set at 15% by weight or less (excluding zero). By incorporating the Ga constituent in a range of 15% by weight or less (excluding zero), a coercive force (HcJ) of 3500 Oe or more and a residual magnetic flux density (Br) of 4000 G or more can both be achieved. In addition, by incorporating the Ga constituent in a range of from 0.1 to 8.0% by weight, a coercive force (HcJ) of 3500 Oe or more and a residual magnetic flux density (Br) of 4500 G or more can both be achieved.

Subsequently, the mean grain size of the sintered bodies was measured for a sample having no Ga constituent added thereto, and for samples having 2.0% by weight, 4.0% by weight, and 7.0% by weight added. The results are shown in Table 19. The mean grain size measurement conditions were as described above.

FIG. 19 shows that the samples which had a Ga constituent added thereto had a finer mean grain size than the sample which did not have a Ga constituent added thereto, and that the finer the mean grain size was, the higher the coercive force (HcJ) was attained.

EXAMPLE 2-2

Sintered bodies were prepared under the same conditions as in Example 2-1, except that $CaCO_3$ powder was not added during mixing, and, the additive amount of the $Ga_2O_3$ powder (primary particle size: 2 μm) on the second milling was between 0 and 8.0% by weight, and the types and additive amounts of additives on the second milling other than $Ga_2O_3$ powder were set as follows:

$SiO_2$ powder (primary particle size: 0.01 μm): 0.6% by weight $CaCO_3$ powder (primary particle size: 1 μm): 0.7% by weight $SrCO_3$ powder (primary particle size: 2 μm): 0.35% by weight $BaCO_3$ powder (primary particle size: 0.05 μm): 1.4% by weight Carbon powder (primary particle size: 0.05 μm): 0.4% by weight Sorbitol (primary particle size: 10 μm): 1.2% by weight The coercive force (HcJ) and residual magnetic flux density (Br) of the obtained samples were measured in the same manner as in Example 2-1, and the compositions were analyzed in the same manner as in Example 2-1. The results are shown in Table 19. For the samples obtained in Example 2-2, FIG. 23 illustrates the relationship between the additive amount of Ga constituent and coercive force (HcJ), FIG. 24 shows the relationship between the additive amount of Ga constituent and residual magnetic flux density (Br), and FIG.

25 shows the relationship between coercive force (HcJ) and residual magnetic flux density (Br). It is noted that in FIG. 25 the value written in the vicinity of each plot is the additive amount of Ga constituent.

Figure 23:
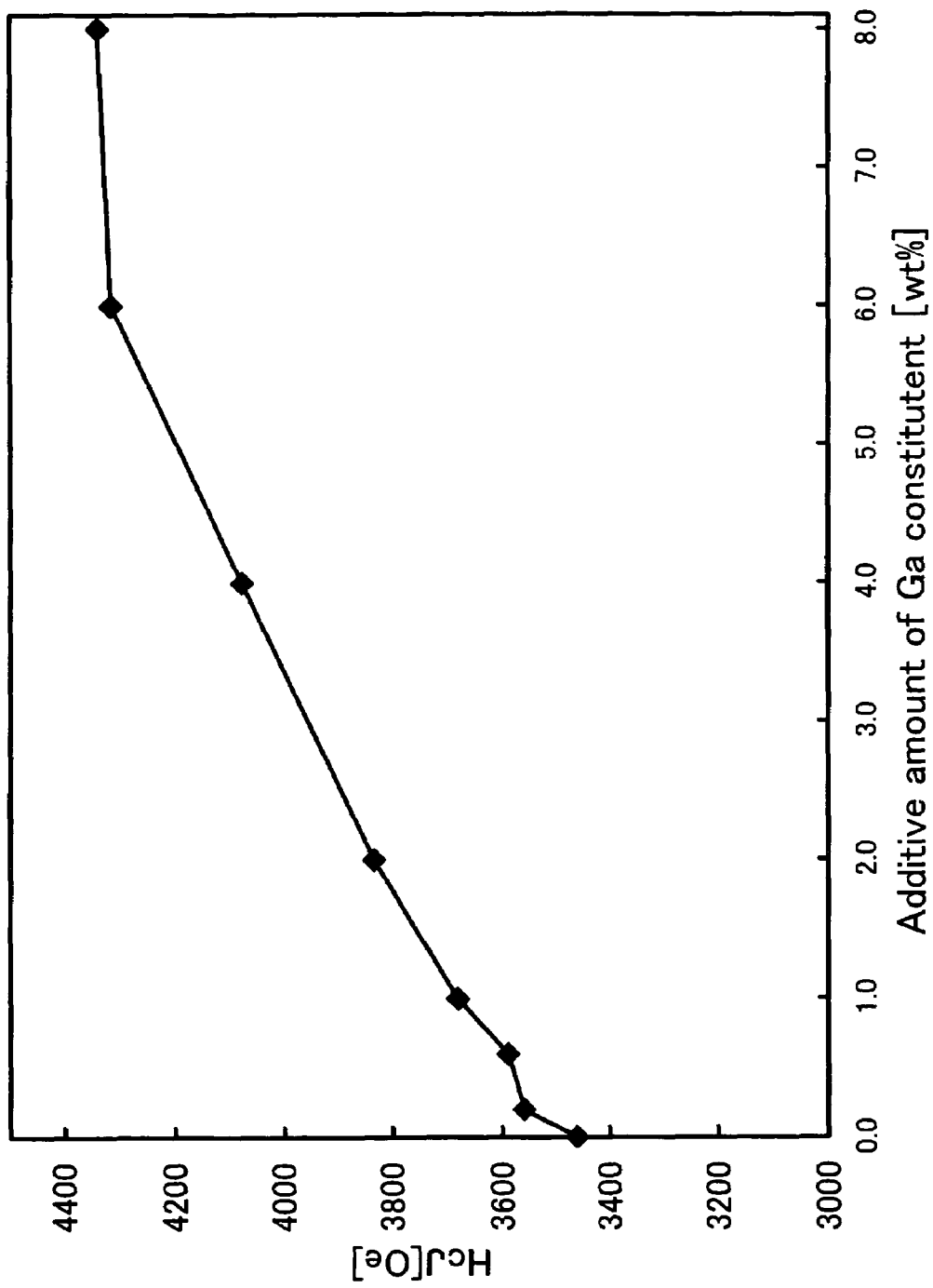
FIG. 23 is a graph showing the relationship between the additive amount of Ga constituent and coercive force (HcJ) in Example 2-2.
Figure 24:
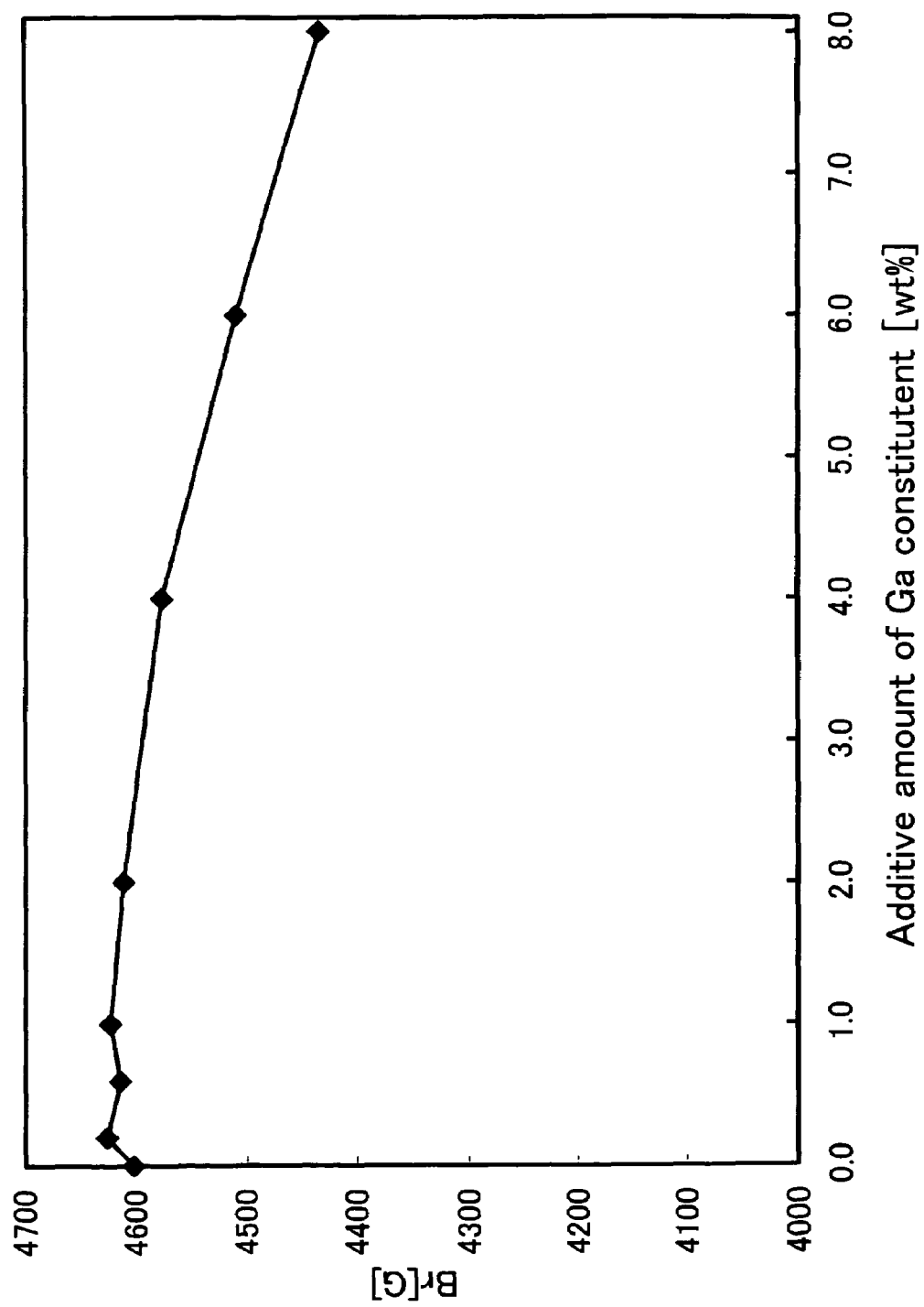
FIG. 24 is a graph showing the relationship between the additive amount of Ga constituent and residual magnetic flux density (Br) in Example 2-2.
Figure 25:
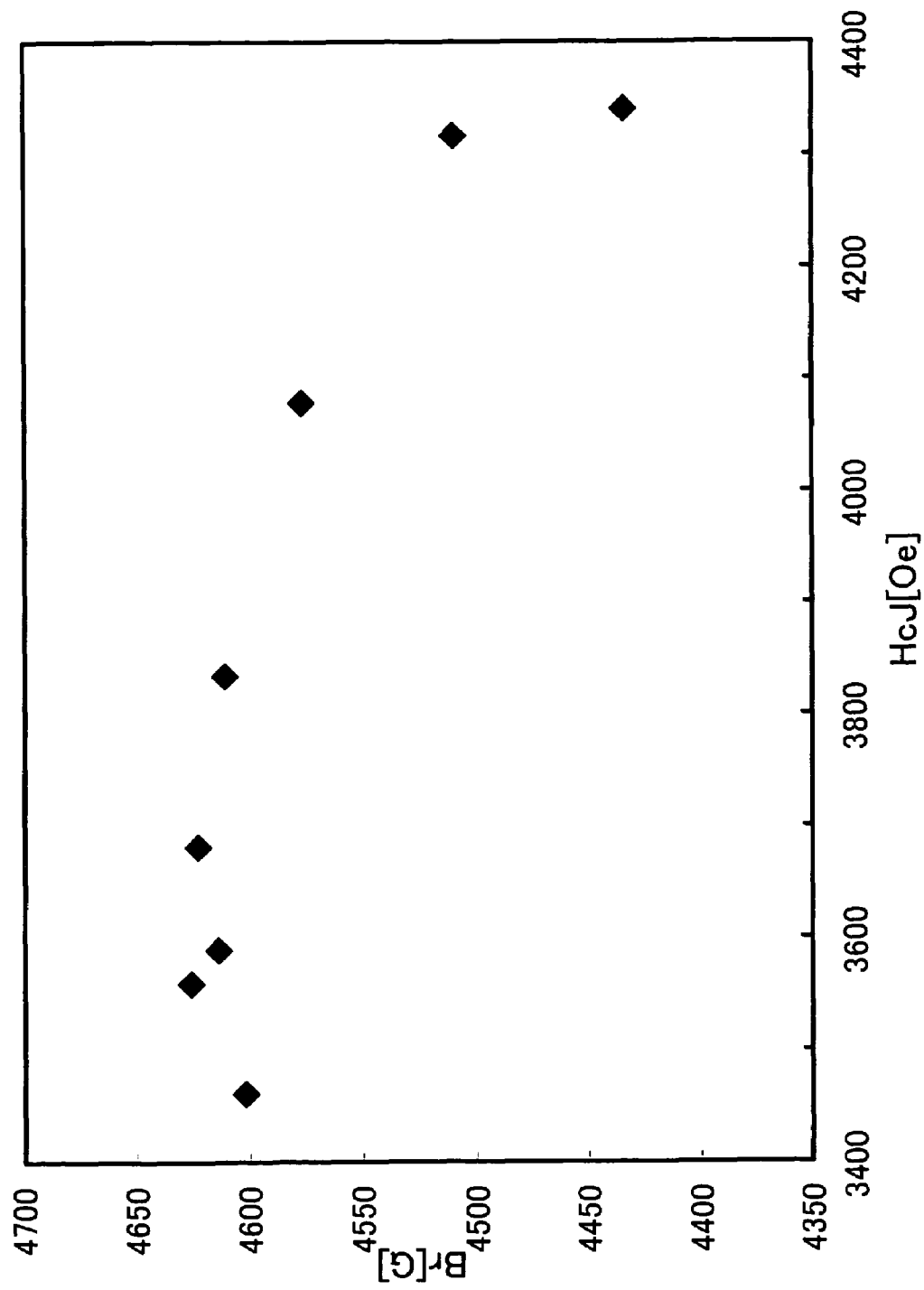
FIG. 25 is a graph showing the relationship between coercive force (HcJ) and residual magnetic flux density (Br) in Example 2-2.

As shown in FIGS. 23 to 25, the same trends as those in Example 2-1 were confirmed even for Example 2-2. Moreover, FIGS. 23 and 24 show that if the additive amount of Ga constituent is in a range of from 0.02 to 3.0% by weight, coercive force (HcJ) improves without causing any decrease in residual magnetic flux density (Br).

EXAMPLE 2-3

A sintered body was prepared under the same conditions as in Example 2-1, except that Sr was selected as element A, and "b" in the above formula 1 was weighed out so as to have the value given in FIG. 19. The coercive force (HcJ) and residual magnetic flux density (Br) of the obtained sample were also measured in the same manner as in Example 2-1, and the composition was analyzed in the same manner as in Example 2-1. The results are shown in Table 19.

As shown in FIG. 19, when "b" was in a range of from 12.9 to 16.3, a coercive force (HcJ) of 3400 Oe or more and a residual magnetic flux density (Br) of 4000 G or more were both achieved.

EXAMPLE 2-4

A sintered body was prepared under the same conditions as in Example 1-3, except that Sr and Ba were selected as element A, and a Ga constituent and an Al constituent were added in combination. Magnetic properties were evaluated under the same conditions as in Example 2-1, and these results are shown in FIG. 19. The primary particle size of the $Al_2O_3$ powder that was employed as the Al constituent was 0.5 µm.

As shown in FIG. 19, coercive force (HcJ) and residual magnetic flux density (Br) were both achieved at a high level even when the Ga constituent and Al constituent were added in combination.

The phases of the sintered bodies obtained in Example 2-1, Example 2-2, Example 2-3, and Example 2-4 were identified by X-ray diffraction. These results showed that although all the sintered bodies contained M phase, this was about from 5 to 20% in terms of molar ratio, confirming that W phase was the main phase. It is noted that the conditions for X-ray diffraction were the same as in Example 1.

EXAMPLE 3

Example 3 (Example 3-1, Example 3-2, and Example 3-3)

In Example 3 the timing of Ga constituent addition was set as described below, to thereby confirm the relationship between Ga constituent addition timing and magnetic properties.

Example 3-1: Ga constituent added during mixing of the raw material powder.

Example 3-2: Ga constituent added on second milling.

Example 3-3: Ga constituent added on first milling.

EXAMPLE 3-1

Sintered bodies were prepared under the same conditions as in Example 2-1, except that during blending 2.0 to 6.0% by weight of $Ga_2O_3$ powder (primary particle size: 2 µm) was added, and that during the second milling, 0.6% by weight of $SiO_2$ powder (primary particle size: 0.01 µm), 0.7% by weight of $CaCO_3$ powder (primary particle size: 1 µm), 0.35% by weight of $SrCO_3$ powder (primary particle size: 2 µm), 1.4% by weight of $BaCO_3$ powder (primary particle size: 0.05 µm), and 0.4% by weight of carbon powder (primary particle size: 0.05 µm) were each added.

EXAMPLE 3-2

Sintered bodies were prepared under the same conditions as in Example 3-1, except that the timing of $Ga_2O_3$ powder (primary particle size: 2 µm) addition was changed to on the second milling.

Figure 27:
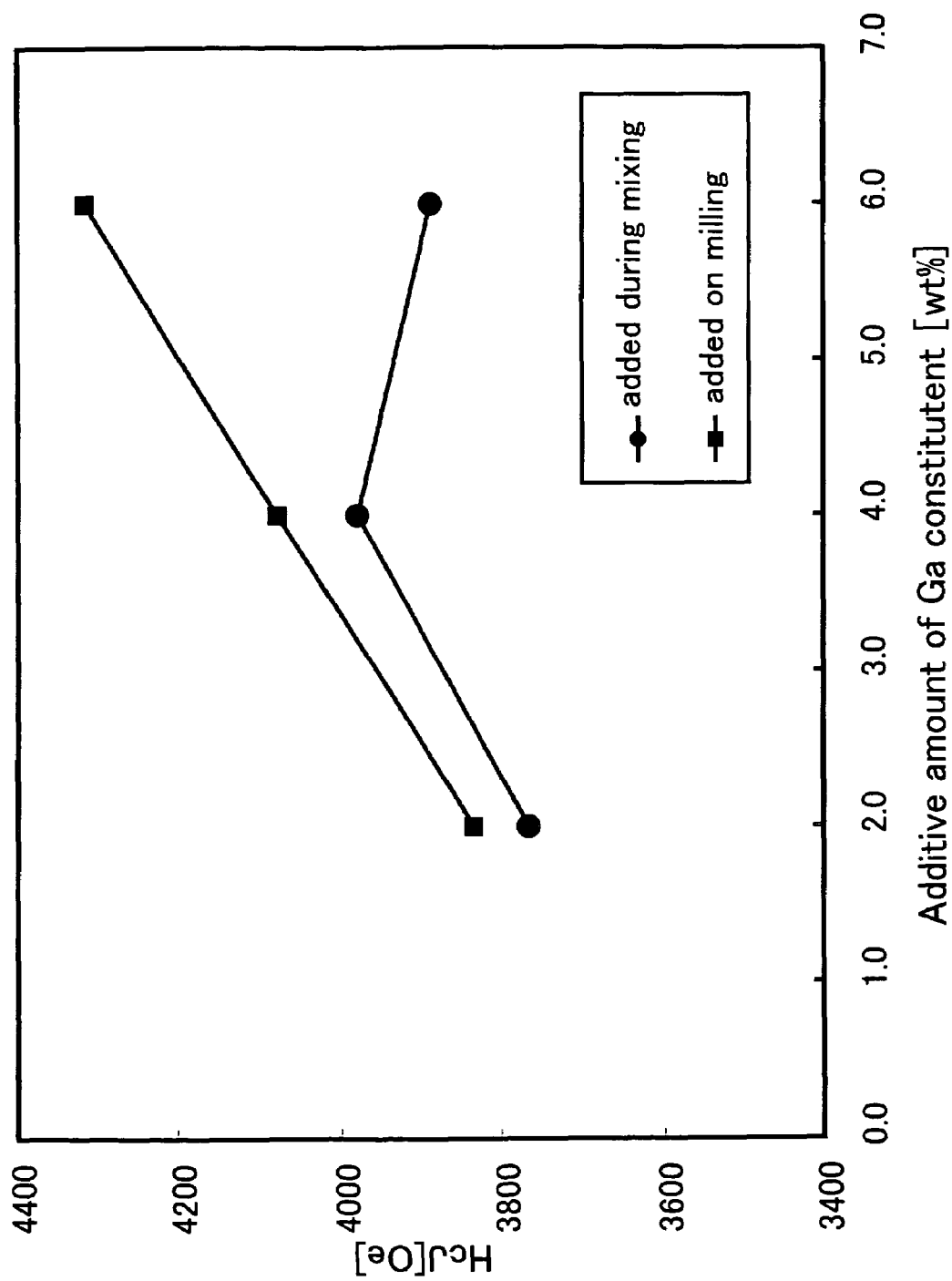
FIG. 27 is a graph showing the relationship between the additive amount of Ga constituent and coercive force (HcJ) for the sintered bodies obtained in Example 3-1 and Example 3-2.
Figure 28:
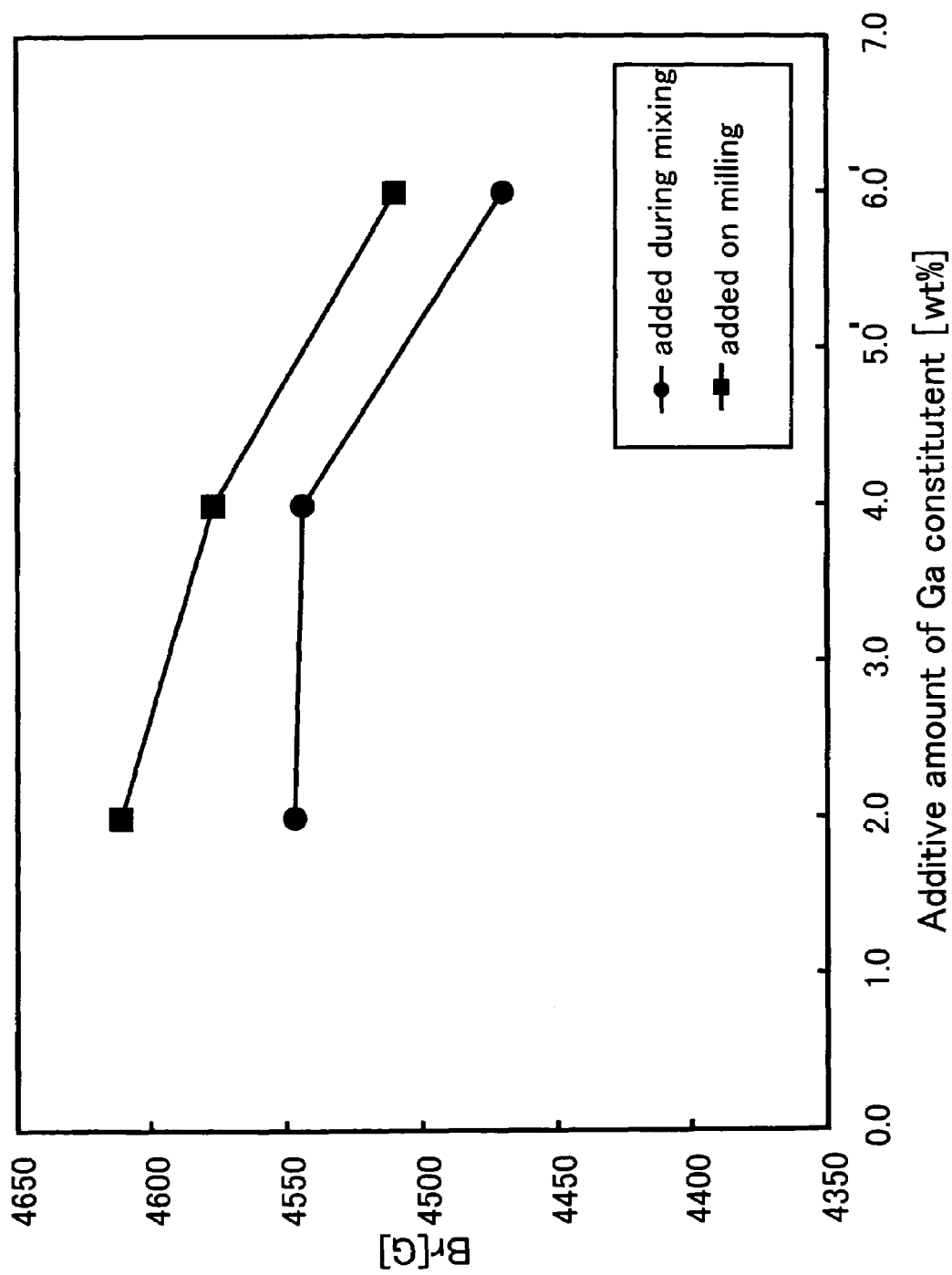
FIG. 28 is a graph showing the relationship between the additive amount of Ga constituent and residual magnetic flux density (Br) for the sintered bodies obtained in Example 3-1 and Example 3-2.

The coercive force (HcJ) and residual magnetic flux density (Br) of the sintered bodies obtained in Example 3-1 and Example 3-2 were measured under the same conditions as in Example 1, and these results are shown in FIGS. 26 to 28. Composition analysis was conducted in the same manner as in Example 1, and the results are shown in FIG. 26.

From FIG. 27, the effects of an improvement in coercive force from Ga constituent addition were confirmed for both the cases of adding the Ga constituent during mixing or adding during milling. However, a higher coercive force (HcJ) was attained when adding during milling.

In addition, FIG. 28 shows that a higher residual magnetic flux density (Br) value was attained by adding the Ga constituent during milling rather than adding during mixing.

From the above results, it was learned that the timing for adding the Ga constituent is especially preferable during milling.

EXAMPLE 3-3

A sintered body was prepared under the same conditions as in Example 3-2, except that 4.0% by weight of $Ga_2O_3$ powder (primary particle size: 2 µm) was added on the first fine milling.

The coercive force (HcJ) and residual magnetic flux density (Br) of the obtained sample in Example 3-3 were measured, and these results are shown in FIG. 26.

A comparison of the three samples having a 4.0% by weight additive amount of Ga constituent in FIG. 26 shows that the coercive force (HcJ) was highest for, in order, the sample in which the Ga constituent was added on the first milling, then the sample in which the Ga constituent was added on the second milling, and then the sample in which the Ga constituent was added during mixing. In addition, the samples obtained in Example 3-2 and Example 3-3 also showed a higher residual magnetic flux density (Br) than the sample obtained in Example 3-1.

From the above results, it was confirmed that during milling is more preferable than during mixing as the timing for adding the Ga constituent, and that an especially large improvement in coercive force can be expected by adding the Ga constituent during the first milling.

EXAMPLE 4

Example 4 (Example 4-1, and Example 4-2)

Experiments which were conducted to confirm the effects of varying additive amounts of $SrCO_3$ and $BaCO_3$ added after calcining on magnetic properties are shown as Example 4.

EXAMPLE 4-1

Sintered bodies were prepared under the same conditions as in Example 2-1, except that during the second fine milling, in addition to 0.6% by weight of $SiO_2$ powder (primary particle size: 0.01 μm), 0.35% by weight of $CaCO_3$ powder (primary particle size: 1 μm), 0.4% by weight of carbon powder (primary particle size: 0.05 μm), 1.2% by weight of sorbitol (primary particle size: 10 μm), and 6.0% by weight of $Ga_2O_3$ powder (primary particle size: 2 μm) being added, $SrCO_3$ powder (primary particle size: 2 μm) and $BaCO_3$ powder (primary particle size: 0.05 μm) were added in the amounts shown in FIG. 29.

EXAMPLE 4-2

Sintered bodies were prepared under the same conditions as in Example 4-1, except that the additive amount of $SiO_2$ powder (primary particle size: 0.01 μm) during the second milling was set at 0.45% by weight.

The coercive force (HcJ) and residual magnetic flux density (Br) of the sintered bodies obtained in Example 4-1 and Example 4-2 were measured under the same conditions as in Example 1, and these results are shown in FIG. 29. Composition analysis was conducted in the same manner as in Example 1, and the results are shown in FIG. 29.

As shown in FIG. 29, the residual magnetic flux density (Br) and coercive force (HcJ) values vary as the additive amounts of the additives on the second fine milling, but high magnetic properties were attained for all aspects investigated in the present Example.

EXAMPLE 5

Example 5 (Example 5-1, Example 5-2, and Example 5-3)

While the above Examples 1-4 relate to $Fe_2$ W-type ferrite, an experiment carried out to confirm the effects of adding the additives recommended by the present invention on the Zn W-type ferrite represented by formula 3 is shown as Example 5.

EXAMPLE 5-1

$Fe_2O_3$ powder (primary particle size: 0.3 μm), $SrCO_3$ powder (primary particle size: 2 μm), and ZnO powder (primary particle size: 0.8 μm) were prepared as raw material powders. These raw material powders were weighed out so that the sintered body compositions were $SrZn_{1.5}Fe_{15}$. The compositions were then blended and milled for 2 hours using a wet attritor.

Next, calcining was carried out in air. The calcining temperature, retention time, rate in temperature rise to the heating retention temperature and rate in temperature fall from the heating retention temperature were the same as in Example 2.

Subsequently, pulverizing was carried under the same conditions as in Example 2 using a vibration mill.

The following fine milling was carried out in two stages using a ball mill. The first milling was carried out in the same manner as in Example 2, except that prior to the first milling 1.2% by weight of sorbitol (primary particle size: 10 μm) was added as a polyhydric alcohol.

After the first milling, the milled powders were subjected to heat treatment under retention conditions of 800° C. for 1 hour in air. The rate in temperature rise to the heating retention temperature and rate in temperature fall from the heating retention temperature were the same as in Example 2.

Subsequently, the second milling was carried out by wet milling with a ball mill, whereby slurries for wet compacting were obtained. Prior to the second milling, 0.6% by weight of $SiO_2$ powder (primary particle size: 0.01 μm), 0.35% by weight of $CaCO_3$ powder (primary particle size: 1 μm), and 1.2% by weight of sorbitol (primary particle size: 10 μm) were added. To the resulting mixtures, from 0 to 0.8% by weight of $Ga_2O_3$ powder (primary particle size: 2 μm) was added.

The slurries which had undergone the second milling were concentrated in a centrifugal separator. The concentrated slurries for wet compacting were then subjected to compacting in a magnetic field. The applied magnetic field (vertical magnetic field) was 12 kOe (1000 kA/m), and the compacted bodies had a cylindrical form with a diameter of 30 mm and a height of 15 mm. No defects formed in any of the compacts. The compacted bodies were dried in air, and then sintered at a temperature rising rate of 5° C./minute at a maximum temperature of 1240° C. for 1 hour, so as to obtain sintered bodies.

The coercive force (HcJ) and residual magnetic flux density (Br) of the sintered bodies obtained in Example 5-1 were measured under the same conditions as in Example 1. These results are shown in FIG. 30.

As shown in FIG. 30, coercive force (HcJ) improved while suppressing the decrease in residual magnetic flux density (Br) even when a Ga constituent was added to Zn W-type ferrite.

EXAMPLE 5-2

Sintered bodies were prepared under the same conditions as in Example 5-1, except that the raw material powders were weighed out so that the sintered body composition was $SrZn_{1.3}Fe_{14}$, and that from 0 to 1.5% by weight of $Al_2O_3$ (primary particle size: 0.5 μm) was added in place of $Ga_2O_3$ powder.

EXAMPLE 5-3

A sintered body was prepared under the same conditions as in Example 5-1, except that the raw material powders were weighed out so that the sintered body composition was $SrZn_{1.2}Fe_{13}$, and that $Ga_2O_3$ powder and $Al_2O_3$ powder were added in combination.

The coercive force (HcJ) and residual magnetic flux density (Br) of the sintered bodies obtained in Example 5-2 and Example 5-3 were measured under the same conditions as in Example 1. These results are shown in Table 30.

FIG. 30 shows that coercive force (HcJ) could be improved by adding an Al constituent to Zn W-type ferrite.

The invention claimed is:

1. A ferrite magnetic material, characterized in that:
a main constituent has a compound represented by composition formula $AFe^{2+}_aFe^{3+}_bO_{27}$ (wherein A comprises at least one element selected from Sr, Ba and Pb; $1.5 \leq a \leq 2.1$; and $12.9 \leq b \leq 16.3$):
a first additive comprises a Ca constituent (0.3 to 3.0% by weight in terms of $CaCO_3$) and/or a Si constituent (0.2 to 1.4% by weight in terms of $SiO_2$); and
a second additive comprises at least one of an Al constituent (0.01 to 1.5% by weight in terms of $Al_2O_3$), a W constituent (0.01 to 0.6% by weight in terms of $WO_3$), a Ce constituent (0.001 to 0.6% by weight in terms of $CeO_2$), a Mo constituent (0.001 to 0.16% by weight in terms of $MoO_3$), and a Ga constituent (0.001 to 15% by weight in terms of $Ga_2O_3$); and the ferrite magnetic material comprises a main phase of W-type hexagonal ferrite.

2. The ferrite magnetic material according to claim 1, characterized in that the amount of Al constituent is from 0.1 to 0.9% by weight in terms of $Al_2O_3$.

3. The ferrite magnetic material according to claim 1, characterized in that the amount of W constituent is from 0.1 to 0.6% by weight in terms of $WO_3$.

4. The ferrite magnetic material according to claim 1, characterized in that the amount of Ce constituent is from 0.01 to 0.4% by weight in terms of $CeO_2$.

5. The ferrite magnetic material according to claim 1, characterized in that the amount of Mo constituent is from 0.005 to 0.10% by weight in terms of $MoO_3$.

6. The ferrite magnetic material according to claim 1, characterized in that the amount of Ga constituent is from 0.02 to 8.0% by weight in terms of $Ga_2O_3$.

7. The ferrite magnetic material according to claim 1, characterized in that in the composition formula, $1.6 \leq a \leq 2.0$; and $13.5 \leq b \leq 16.2$.

8. The ferrite magnetic material according to claim 1, characterized in that Sr and Ba are both present as the element A.

9. The ferrite magnetic material according to claim 1, characterized in that the ferrite magnetic material constitutes any of a ferrite magnet powder, a bonded magnet as a ferrite magnet powder which is dispersed in a resin, and a magnetic recording medium as a film-like magnetic phase.

10. The ferrite magnetic material according to claim 1, characterized in that the ferrite magnetic material has both a coercive force (HcJ) of 3.0 kOe or more and a residual magnetic flux density (Br) of 4.0 kG or more.

11. The ferrite magnetic material according to claim 1, characterized in that the ferrite magnetic material has both a coercive force of 3.3 kOe or more and a residual magnetic flux density of 4.6 kG or more.

12. A ferrite magnetic material, characterized in that:

a main constituent has a compound represented by composition formula $AZn_cFe_dO_{27}$ (wherein A comprises at least one element selected from Sr, Ba and Pb; $1.1 \leq c \leq 2.1$; and $13 \leq d \leq 17$);

a first additive comprises a Ca constituent (0.3 to 3.0% by weight in terms of $CaCO_3$) and/or a Si constituent (0.2 to 1.4% by weight in terms of $SiO_2$; and a second additive comprises at least one of an Al constituent (0.01 to 1.5% by weight in terms of $Al_2O_3$), a W constituent (0.01 to 0.6% by weight in terms of $WO_3$), a Ce constituent (0.001 to 0.6% by weight in terms of $CeO_2$), a Mo constituent (0.001 to 0.16% by weight in terms of $MoO_3$), and a Ga constituent (0.001 to 15% by weight in terms of $Ga_2O_3$); and the ferrite magnetic material comprises a main phase of W-type hexagonal ferrite.

13. The ferrite magnetic material according to claim 12, characterized in that the amount of Ga constituent is from 0.02 to 3.0% by weight in terms of $Ga_2O_3$.

14. The ferrite magnetic material according to claim 12, characterized in that the amount of Ga constituent is from 3.0 to 8.0% by weight in terms of $Ga_2O_3$.

15. A ferrite sintered magnet, characterized in that:

a main constituent has a composition represented by composition formula $AFe^{2+}_aFe^{3+}_bO_{27}$ (wherein A comprises at least one element selected from Sr, Ba and Pb; $1.5 \leq a \leq 2.1$; and $12.9 \leq b \leq 16.3$);

a first additive comprises a Ca constituent (0.3 to 3.0% by weight in terms of $CaCO_3$) and/or a Si constituent (0.2 to 1.4% by weight in terms of $SiO_2$); and a second additive comprises at least one of an Al constituent (0.01 to 1.5% by weight in terms of $Al_2O_3$), a W constituent (0.01 to 0.6% by weight in terms of $WO_3$), a Ce constituent (0.001 to 0.6% by weight in terms of $CeO_2$), a Mo constituent (0.001 to 0.16% by weight in terms of $MoO_3$), and a Ga constituent (0.001 to 15% by weight in terms of $Ga_2O_3$).

16. The ferrite sintered magnet according to claim 15, characterized in that the ferrite sintered magnet has a mean grain size of 0.8 μm or less.

17. The ferrite sintered magnet according to claim 15, characterized in that the ferrite sintered magnet has a mean grain size of 0.6 μm or less.

18. The ferrite sintered magnet according to claim 15, characterized in that the ferrite sintered magnet has both a coercive force of 3.5 kOe or more and a residual magnetic flux density of 4.0 kG or more.

19. The ferrite sintered magnet according to claim 15, characterized in that Sr and Ba are both present as the element A.

* * * * *